US005768910A

United States Patent [19]
Inagaki et al.

[11] Patent Number: 5,768,910
[45] Date of Patent: Jun. 23, 1998

[54] ADSORPTION HEAT PUMP

[75] Inventors: Shinji Inagaki; Yuri Yamada, both of Nagoya; Yoshiaki Fukushima, Aichi-ken; Masanobu Hasatani, Nagoya; Fujio Watanabe, Owariasahi, all of Japan

[73] Assignee: Kabushiki Kaisha Toyota Chuo Kenkyuso, Aichi-ken, Japan

[21] Appl. No.: 738,113

[22] Filed: Oct. 25, 1996

[30] Foreign Application Priority Data

Oct. 26, 1995 [JP] Japan .................................. 7-279318
Dec. 11, 1995 [JP] Japan .................................. 7-321783

[51] Int. Cl.⁶ .............................. F25B 17/08; B01J 20/10
[52] U.S. Cl. .............................. 62/480; 502/407; 502/527
[58] Field of Search .......................... 62/476, 480, 101; 502/407, 527

[56] References Cited

U.S. PATENT DOCUMENTS

| | | |
|---|---|---|
| 3,017,261 | 1/1962 | Lumsden . |
| 3,262,771 | 7/1966 | Ban . |
| 3,850,613 | 11/1974 | Allen . |
| 4,525,208 | 6/1985 | Yasukawa et al. . |
| 4,840,671 | 6/1989 | Lynn et al. . |
| 5,188,658 | 2/1993 | Aune et al. . |
| 5,302,558 | 4/1994 | Inoue et al. ............................ 501/80 |
| 5,382,558 | 1/1995 | Inagaki et al. . |
| 5,397,752 | 3/1995 | Inoue et al. ............................ 501/80 |
| 5,399,538 | 3/1995 | Inoue et al. ............................ 502/84 |
| 5,508,081 | 4/1996 | Inagaki et al. . |
| 5,598,721 | 2/1997 | Rockenfeller et al. .................. 62/480 |

OTHER PUBLICATIONS

"Synthesis of Highly Ordered Mesoporous Materials from a Layered Polysilicate," S. Inagaki et al. J. Chem. Soc., Chem. Commun., 1993. pp. 680–682.
"Ordered Mesoporous Molecular Sieves Synthesized By A Liquid–Crystal Template Mechanism," C. T. Kresge et al. Letters To Nature vol. 359 Oct. 22, 1992. pp. 710–712.
"The Preparation of Alkyltrimethylammonium–Kanemite Complexes and Their Conversion to Microporous Materials," Tsuneo Yanagisawa et al. The Chemical Society of Japan 1990; vol. 63, No. 4. pp. 988–992.

Primary Examiner—William Doerrler
Attorney, Agent, or Firm—Oblon, Spivak, McClelland, Maier & Neustadt, P.C.

[57] ABSTRACT

An adsorption heat pump includes a working fluid, an adsorption-desorption unit, and an evaporation-condensation unit connected with the adsorption-desorption unit. The adsorption-desorption unit adsorbs and desorbs vapor resulting from the working fluid, and includes an adsorbent being a porous substance. The porous substance has pores, and exhibits a pore diameter distribution curve having a maximum peak falling in a pore diameter range of from 1 to 10 nm. The pores in the diameter range of ±40% of pore diameter at the maximum peak have pore volume not less than 60% of a whole volume of the porous substance. The evaporation-condensation unit evaporates and condenses the working fluid. The adsorption heat pump can be operated by a low-temperature heat source, and can exhibit a large pumping temperature difference regardless of its small size.

17 Claims, 14 Drawing Sheets

ID PUMP

BACKGROUND OF THE INVENTION

1. Field of the Invention

The present invention relates to an adsorption heat pump which can be operated by a low-temperature heat source, and which can exhibit a large pumping temperature difference regardless of its small size. More particularly, it relates to an adsorption heat pump which employs an adsorbent of a large pumping heat quantity per volume, a large pumping temperature difference, and a small regenerating temperature difference.

2. Description of the Related Art

Adsorption chemical heat pumps employing solid adsorbents do not require a power source such as a compressor, and can advantageously utilize thermal energy of relatively low temperature as actuating energy. For example, when a heat pump is used as an automotive air conditioner, it is possible to use such an air conditioner without applying any load to an engine. Thus, it is possible to expect improvements in terms of fuel consumption, and power performance of automobiles. Further, it is difficult to board compressors on electric cars, because compressors result in heavy loads for electric cars to actuate. Therefore, it is expected to board adsorption-heat-pump air conditioners on electric cars. Furthermore, adsorption heat pumps are believed to be an environment-friendly thermal system, because they can use water, etc., as a working fluid, instead of fluorocarbon.

It has been known that a conventional adsorption pump is prepared by appropriately selecting a working fluid and an adsorbent, and that it is provided with an evaporation unit, a condensation unit, and an adsorption unit including the adsorbent. With reference to FIG. 6, the principle of a conventional adsorption heat pump will be hereinafter described. An adsorption unit 1 is provided with a heat exchanger 1', and has a space for allowing a working fluid to move freely in the adsorbent (not shown). The heat exchanger 1' retrieves from and gives off the heat of the adsorption efficiently. An evaporation unit 2 is provided with a heat exchanger 2', and has a space for holding the working fluid therein. The heat exchanger 2' vaporizes the working fluid. A condensation unit 3 is provided with a heat exchanger 3', and has a space for holding the working fluid therein. The heat exchanger 3' condenses the vaporized working fluid. The adsorption unit 1, the evaporation unit 2, and the condensation unit 3 are connected by piping 5 by way of a valve 4, thereby enabling the working fluid to flow between the evaporation unit 2 and the adsorption unit 1, and between the adsorption unit 1 and the condensation unit 3. Moreover, the evaporation unit 2 and the condensation unit 3 are connected by piping 7 by way of a valve 6.

The operations of the thus constructed conventional adsorption heat pump will be hereinafter described with reference to FIG. 6. First of all, in a cooling mode, the valve 4 is actuated to open the passage in the piping 5 which is disposed between the evaporation unit 2 and the adsorption unit 1. Water having a temperature $T_a$ is flowed into the heat exchanger 2' to vaporize the working fluid. The vaporized working fluid is passed through the piping 5, and is adsorbed by the adsorbent which is disposed in the adsorption unit 1 until a predetermined adsorption is attained. In the heat exchanger 2' of the evaporation unit 2, the evaporation of the working fluid decreases the temperature of water from $T_a$ to $T_{cold}$, or cools the water having the temperate $T_a$ to water having a temperature $T_{cold}$. Whilst, in the heat exchanger 1' of the adsorption unit 1, the adsorbent is cooled by flowing water having a temperate $T_a$ therein. When the predetermined adsorption of the vaporized working fluid is attained, the valve 4 is switched to open the piping 5 which communicates between the adsorption unit 1 and the condensation unit 3. Hot water having a thermal source temperature $T_{reg}$ is flowed into the heat exchanger 1' of the adsorption unit 1 to heat the adsorbent, thereby desorbing the working fluid from the adsorbent. The thus desorbed working fluid is introduced into the condensation unit 3, and is condensed by flowing water having a temperature $T_a$ into the heat exchanger 3' of the condensation unit 3. When the desorption is finished, one adsorption-desorption cycle is completed. Thereafter, the valve 6 is actuated to open the piping 7, thereby transferring the working fluid from the condensation unit 3 to the evaporation unit 2. When the transfer is finished, the valve 6 is closed to start the next adsorption-desorption cycle.

In conventional adsorption heat pumps, the adsorbents are frequently used in a form of powder or grain. The filling density of the adsorbent is an important factor which determines the size of adsorption heat pumps.

Developing a high-performance adsorbent is one of the major technologies to enhance the performance of adsorption heat pumps. The following factors are used to evaluate the performance of adsorbent for adsorption heat pumps: namely; a pumping heat quantity, a pumping temperature difference, and a temperature difference for regenerating adsorbent. It has been known that these factors can be presumed in accordance with an equilibrium in an adsorption isotherm (See Fujio WATANABE, Toshifumi SUGIURA, Masanobu HASATANI, and Chisato MARUMO, Chemical Engineering Papers, Vol. 15, No. 1, pp. 38–43 (1989).).

Silica gel, activated alumina, zeolite, and activated carbon have been examined for the application to adsorbents for adsorption heat pumps. These adsorbents are combined with working fluids, and are examined for the adaptability to adsorbents for adsorption heat pumps. For instance, a zeolite-water system produces a large pumping temperature difference. However, zeolite is less likely to regenerate from the system, and water is less likely to desorb from zeolite. Hence, the zeolite-water system suffers from a problem in that a zeolite-regenerating temperature should be enlarged. Activated alumina also suffers from problems similar to those of zeolite. On the other hand, in a silica gel-water system, or an activated carbon-water system, adsorbents can be recovered by a relatively low-temperature heat source of 100° C. or less. However, the system exhibits a small adsorption-desorption difference so that it requires an adsorbent in a large amount. As a result, the system inevitably enlarges an apparatus per se. Thus, it is difficult to board the system on automobiles.

SUMMARY OF THE INVENTION

The present invention has been developed in view of the aforementioned circumstances. It is therefore an object of the present invention to provide an adsorption heat pump which employs an adsorbent of a large pumping heat quantity per volume, a large pumping temperature difference, and a small regenerating temperature difference.

An adsorption heat pump according to the present invention comprises:

a working fluid;

an evaporation-condensation unit for evaporating and condensing the working fluid;

an adsorption-desorption unit for adsorbing and desorbing vapor resulting from the working fluid, communicating with the evaporation-condensation unit; and an adsorbent disposed in the adsorption-desorption unit, being a porous substance having pores, and exhibiting a pore diameter distribution curve having a maximum peak in a pore diameter range of from 1 to 10 nm, the pores in the pore diameter range of ±40% of pore diameter at the maximum peak having pore volume not less than 60% of whole pore volume of the porous substance.

In the present adsorption heat pump, the maximum peak can preferably fall in a pore diameter range of from 1 to 4 nm, and the summed volume of the pores having a pore diameter falling in a pore diameter range of ±40% of the maximum peak can preferably occupy from 70 to 100% of a total volume of all the pores.

In the present adsorption heat pump, the adsorbent can preferably exhibit a maximum adsorption variation of 0.17 g/ml or more, further preferably from more than 0.25 to less than 1.0 g/ml, when a relative vapor pressure of the working fluid is varied by 0.2 in a water-vapor adsorption isotherm.

Moreover, in the present adsorption heat pump, the adsorbent is preferably inorganic oxide, or a porous substance including silicon oxide.

(On Heat Pump)

In the present invention, a wide variety of known adsorption heat-pumping apparatuses can be utilized as a heat-pumping apparatus per se. The novel adsorbent of the present absorption heat pump (i.e., one of the features of the present invention) can be applied to an adsorption-desorption unit of known adsorption heat-pumping apparatuses. Among known heat pumping apparatuses, an adsorption heat pump, described in the above "Description of the Related Art" section and illustrated in FIG. 6, can be exemplified as a preferred example. Note that, however, it is naturally possible to utilize a plurality of other known heat-pumping apparatuses for the present adsorption heat pump.

In order to apply the novel adsorbent of the present absorption heat pump (i.e., one of the features of the present invention) to an adsorption-desorption unit of known adsorption heat-pumping apparatuses, for instance, in order to fill the adsorbent in an adsorption-desorption unit, a wide variety of known filling methods can be employed. Among known filling methods, a couple of filling methods can be considered an especially-preferred example as follows:

1) the adsorbent is fixed in an adsorption-desorption unit by using a binder; and
2) the adsorbent is filled in an adsorption-desorption unit in a sealed manner.

The novel adsorbent employed by the present adsorption heat pump exhibits a pore diameter distribution curve which has a maximum peak falling in a pore diameter range of from 1 to 10 nm. If such is the case, the Kelvin equation can verify that the adsorbent adsorbs water vapor remarkably when an adsorption isotherm of water vapor extends over a relative vapor pressure ($P/P_o$) of water vapor falling in a range of from 0.12 to 0.81. The Kelvin equation herein determines the relationship between a pore radius (r) and a relative vapor pressure ($P/P_o$) at which an adsorbate undergoes the capillary condensation. The Kelvin equation can be expressed by the following equation (1):

$$\ln (P/P_o)=(2V_L \gamma \cos \Theta)/(rRT) \qquad (1);$$

in which $V_L$ is a molar volume of a liquid adsorbate, $\gamma$ is a surface tension of the liquid adsorbate, $\Theta$ is a contact angle, R is a gas constant, and T is an absolute temperature.

Suppose the adsorbate be water vapor, $V_L=18.05\times10^{-6}$ m³/mol, and $\gamma=72.59\times10^{-3}$ N/m. Substituting these values for $V_L$ and $\gamma$ in Eq. (1), and further substituting R=8.3143 J/deg·mol, $\Theta=0$, and T=298 K for R, $\Theta$, and T therein, Eq (1) yields the following equation (2):

$$\ln (P/P_o)=-1.058/r \qquad (2);$$

in which r is expressed in units of nm.

Suppose the pore diameter of the adsorbent vary in a range of from 1 to 10 nm. In accordance with Eq. (2), it is possible to determine the portion of the water-vapor adsorption isotherm, over which the adsorbent can adsorb the adsorbate (i.e., water vapor) remarkably. The results of the calculation are illustrated as a graph in FIG. 1. It is understood from FIG. 1 that the portion lies over the relative water-vapor pressure ($P/P_o$) falling in a range of from 0.12 to 0.81.

Moreover, the graph illustrated in FIG. 2 shows the results of a conversion by which the horizontal axis of FIG. 1 of the water-vapor absorption isotherms is converted into a temperature (t) of the adsorbent. In the conversion, for instance, the saturated vapor pressure of water vapor at 20° C. substitutes for P in the relative water-vapor pressure ($P/P_o$) in order to determine a temperature (t) of the adsorbent. It is evident from FIG. 2 that, when the adsorbent has a pore diameter of from 1 to 10 nm, a heat source of a relatively low temperature (e.g., from 20° to 70° C., further preferably from 30° to 70° C.) can be utilized.

In addition, when the pores have a pore diameter falling in a pore diameter range of ±40% of the maximum peak in a pore diameter distribution curve, and when the summed volume of such pores occupy 60% or more, further preferably from 70 to 100%, with respect to the total volume of all the pores, the rise of the water-vapor isotherms (i.e., the rise of the water-vapor adsorption) takes place in a small $P/P_o$ range. Accordingly, an adsorption heat pump can be operated with a small temperature difference.

For example, let us consider two adsorbents "A" and "B" whose pore diameter distributions differ from each other in terms of uniformity as illustrated in FIG. 3. Specifically, the adsorbent "A" involves pores which have a pore diameter falling in a pore diameter range of ±40% of 2 nm (i.e., from 1.2 to 2.8 nm), and whose summed volume occupies 70% with respect to the total volume of all the pores. The adsorbent "B" involves pores which have a pore diameter falling in a pore diameter range of ±40% of 2 nm (i.e., from 1.2 to 2.8 nm), but whose summed volume occupies 50% with respect to the total volume of all the pores. FIG. 4 simulates the water-vapor absorption isotherms which were exhibited by the two adsorbents "A" and "B". As illustrated in FIG. 4, the adsorbent "A" whose pore diameter distribution was more uniform than that of the adsorbent "B" exhibited the water-vapor absorption isotherm which rose sharply. In other words, the adsorbent "B" whose pore diameter distribution was less uniform than that of the adsorbent "A" exhibited the water-vapor absorption isotherm which rose gently.

The graph illustrated in FIG. 5 shows the results of a conversion of the horizontal axis of FIG. 4 into a temperature (t) of the adsorbent. According to FIG. 5, the temperature differences for obtaining the same pumping heat quantity ($V_1-V_2$) were compared between the adsorbents "A" and "B". It is apparent from FIG. 5 that the temperature difference ($\Delta T_1$) exhibited by the adsorbent "A" was smaller than the temperature difference ($\Delta T_2$) exhibited by the adsorbent "B". Accordingly, a heat pump employing the adsorbent "A" can be actuated by a small temperature difference than a heat pump employing the adsorbent "B".

As having been described so far, when a heat pump employs a porous adsorbent which exhibits a pore diameter distribution curve having a maximum peak falling in a pore diameter range of from 1 to 10 nm, in which some of the pores have a pore diameter falling in a pore diameter range of ±40% of the maximum peak of the pore diameter distribution curve, and in which the summed volume of such pores occupies 60% or more with respect to the total volume of all the pores, such an adsorption heat pump can be operated by a heat source of a relatively low temperature and of a small temperature difference.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIGS. 14A to D are graphs for illustrating the water-vapor adsorption of a "FSM/10" meso-porous substance in the Second Preferred Embodiment of the present invention, subjected to different preliminary treatments, wherein;

FIG. 14A illustrates a water-vapor adsorption isotherm at an adsorption temperature 25° C. of the "FSM/10" meso-porous substance subjected to the first preliminary treatment at 25° C. for 3 hours;

FIG. 14B illustrates a water-vapor adsorption isotherm at an adsorption temperature 25° C. of the "FSM/10" meso-porous substance subjected to the second preliminary treatment at 25° C. for 3 hours;

FIG. 14C illustrates a water-vapor adsorption isotherm at an adsorption temperature 25° C. of the "FSM/10" meso-porous substance subjected to the third preliminary treatment at 25° C. for 3 hours; and FIG. 14D illustrates a water-vapor adsorption isotherm at an adsorption temperature 25° C. of the "FSM/10" meso-porous substance subjected to the fourth preliminary treatment at 70° C. for 3 hours;

FIGS. 15A and B are graphs for illustrating the water-vapor adsorption isotherms of a "FSM/16" meso-porous substance in the Second Preferred Embodiment of the present invention, subjected to different preliminary treatments, wherein;

FIG. 15A illustrates a water-vapor adsorption isotherm at an adsorption temperature 25° C. of the "FSM/16" meso-porous substance subjected to the first preliminary treatment at 300° C. for 3 hours; FIGS. 16A to C are graphs for illustrating the water-vapor adsorption isotherms of a type "A" silica gel, subjected to different preliminary treatments, wherein;

FIG. 16A illustrates a water-vapor adsorption isotherm at an adsorption temperature 25° C. of the type "A" silica gel subjected to the first preliminary treatment at 80° C. for 3 hours;

FIG. 16B illustrates a water-vapor adsorption isotherm at an adsorption temperature 25° C. of the type "A" silica gel subjected to the second preliminary treatment at 25° C. for 4 hours; and FIG. 16C illustrates a water-vapor adsorption isotherm at an adsorption temperature 20° C. of the type "A" silica gel subjected to the third preliminary treatment at 25° C. for 4 hours.

DETAILED DESCRIPTION OF THE PREFERRED EMBODIMENTS

Figure 1:
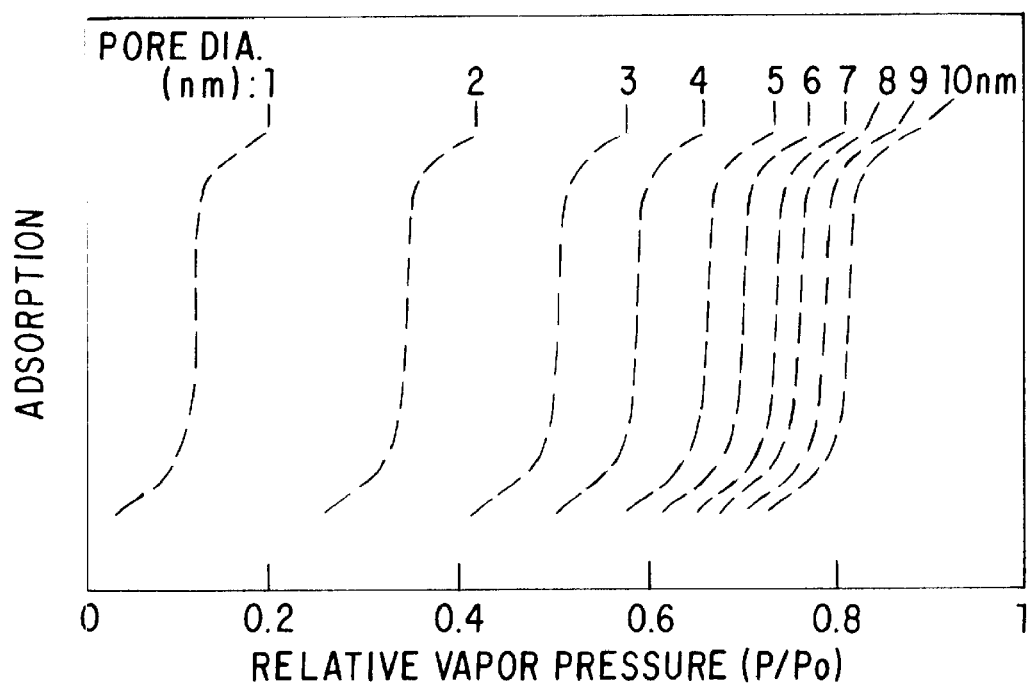
FIG. 1 is a graph for illustrating the relationships between adsorption amounts and relative vapor pressures of water.
Figure 2:
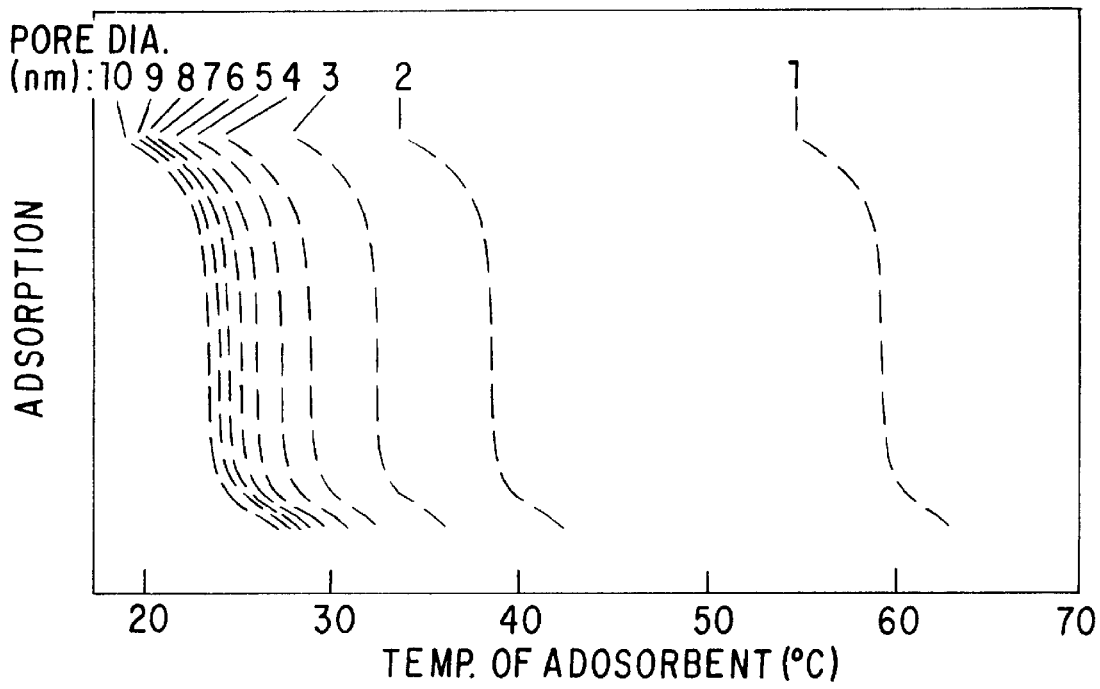
FIG. 2 is a graph for illustrating the relationships between the adsorption amounts and the temperatures of adsorbent obtained from the abscissa of FIG. 1 (i.e., the relative vapor pressures of water) by substituting the saturated vapor pressure of water at 20° C. for $P/P_o$.
Figure 3:
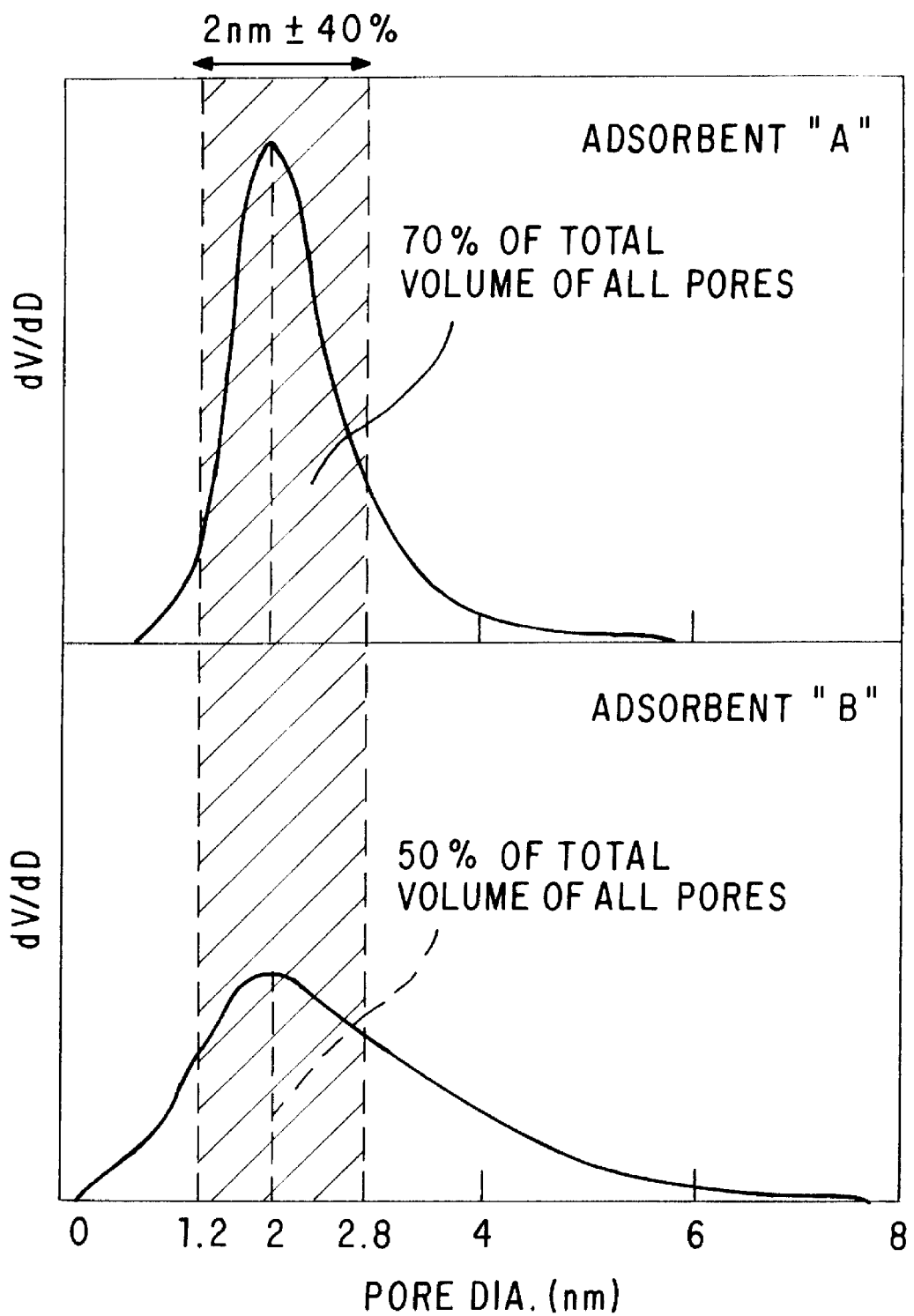
FIG. 3 is a graph for illustrating the pore diameter distribution curves exhibited by adsorbents "A" and "B"
Figure 4:
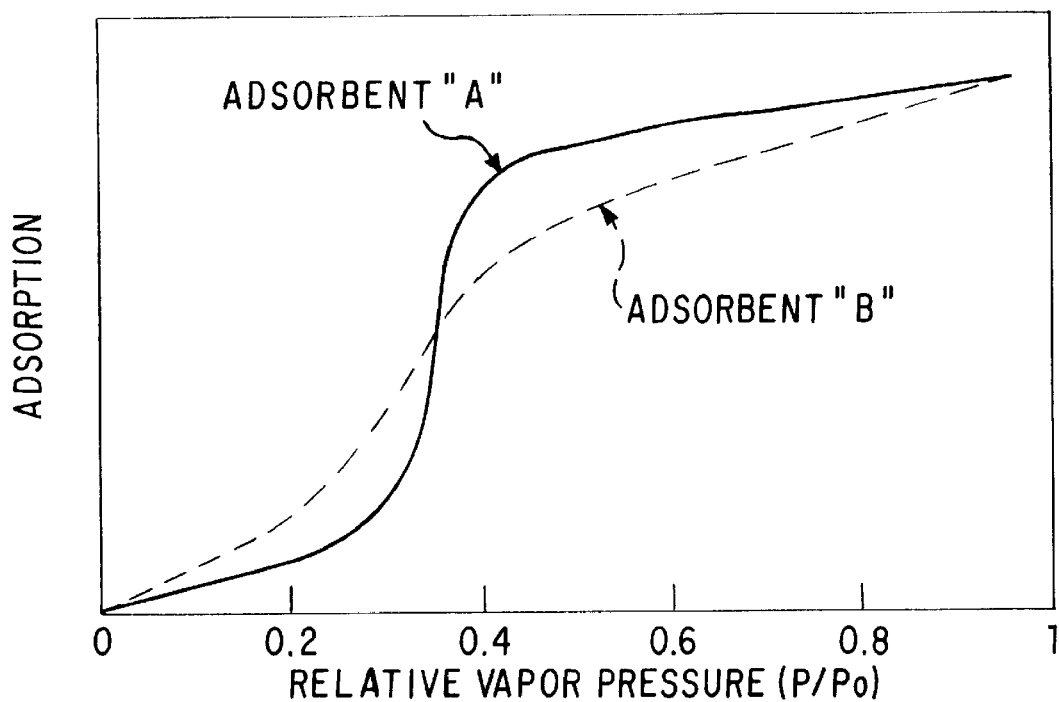
FIG. 4 is a graph for simulating the water-vapor adsorption isotherms exhibited by the adsorbents "A" and "B"
Figure 5:
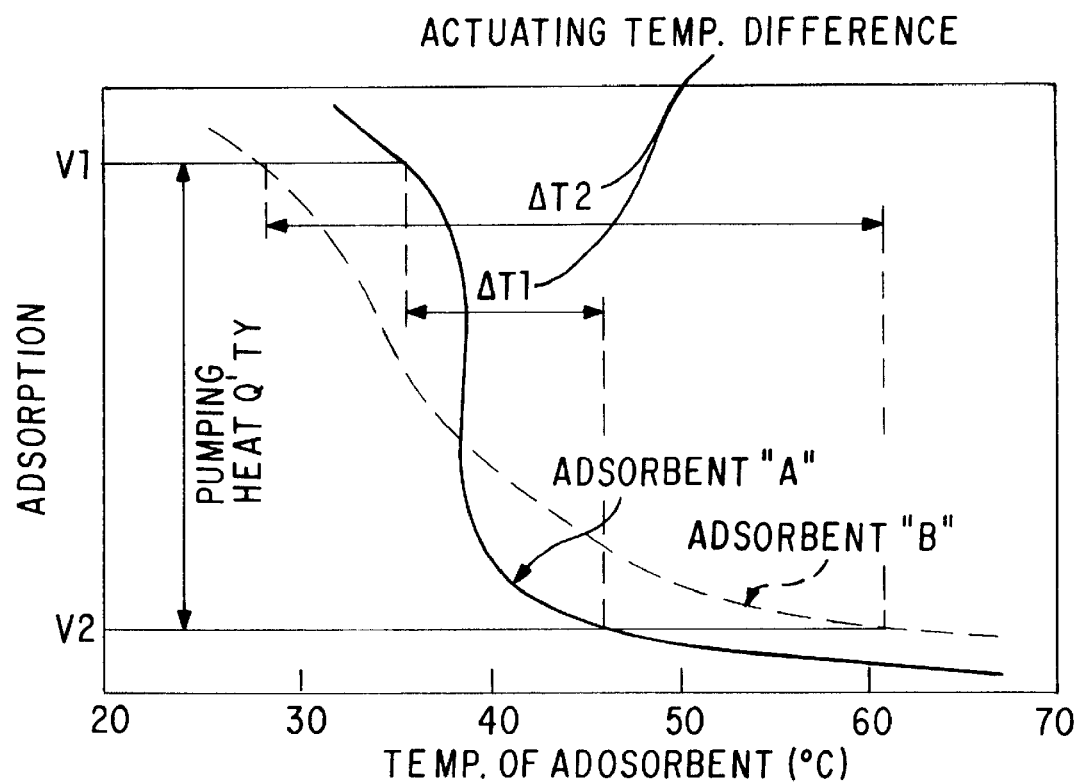
FIG. 5 is a graph for illustrating the relationships between the adsorption and the temperatures of adsorbents, the graph which is prepared by converting the relative vapor pressures of water, plotted along the horizontal axis of FIG. 4, into the temperatures of adsorbents by substituting the saturated vapor pressure of water at 20° C. for $P/P_o$.

Having generally described the present invention, a further understanding can be obtained by reference to the specific preferred embodiments which are provided herein for the purpose of illustration only and not intended to limit the scope of the appended claims.

(On Adsorbent)

The present heat pump can utilize a porous substance as the adsorbent. As for the porous substance, it is possible to utilize a meso-porous substance. The meso-porous substance can be synthesized by reacting a layer silicate with a surfactant (See T. Yanagisawa et al., Bull. Chem. Soc. Japan., 63, pp. 988–992 (1990) incorporated herein by reference.). The meso-porous substance has a structure which comprises silicate sheets, and cylindrical pores. The silicate sheets are bent periodically (e.g., at intervals of from 2 to 12 nm), and are bonded between tops of the sheet and bottoms of the sheet next to it. The cylinder-shaped pores have a diameter of from 1 to 10 nm, and are arranged periodically in the clearances between the silicate sheets. According to an X-ray diffraction pattern exhibited by the meso-porous substance, at least one peak including a maximum intensity peak can be observed at positions which correspond to the d-spacing of 2 nm or more. In particular, among the peaks, two to four diffraction peaks can be observed, and the diffraction peaks specify the presence of a hexagonal lattice. In fact, according to a picture taken by a transmission electron microscope, a honeycomb-shaped skeleton texture can be observed (See S. Inagaki et al., J. Chem. Soc., Chem. Commun., No. 8, pp. 680–682 (1993) incorporated herein by reference.).

In addition to the aforementioned porous substance, there is provided a meso-porous molecular sieve (MCM-41) which is produced by using the micelle texture of a surfactant as a template (See Kresge et al., Nature, Vol. 359, p. 710 (1992) incorporated herein by reference.). This MCM-41 also has a structure in which cylinder-shaped pores having a diameter of from 1 to 10 nm are arranged regularly, and which has a honeycomb-shaped cross-section as well. However, in the cellular walls, the MCM-41 has a different structure from that of the aforementioned meso-porous substance. According to an X-ray diffraction pattern exhibited by the MCM-41, at least one peak can be observed at positions which correspond to the d-spacing of 2 nm or more. A diffraction peak of the maximum intensity is included in the peak.

On the other hand, according to an X-ray diffraction pattern exhibited by silica, for example, by silica gel, one of the conventional porous supports, no distinct diffraction peak can be observed. The X-ray diffraction peaks imply that there is a cyclic structure which exhibits the d-spacing corresponding to the peak angle, in a substance. Therefore, silica gel does not have a cyclic structure at least in the range of d=0.15–12 nm which is equivalent to 0.7 (deg.) <2θ<60 (deg.). This fact indicates that silica gel is amorphous material. Contrary to silica gel, the porous substance employed by the present adsorption pump exhibits an X-ray diffraction pattern in which one or more peaks (preferably from 3 to 5 peaks), including a peak of the maximum intensity, are present at positions corresponding to the d-spacing of 2 nm or more (preferably from 2 to 11 nm), and accordingly has a cyclic structure. Specifically, the X-ray diffraction peaks are the reflection of a structure in which pores having a diameter of from 1 to 10 nm are arranged regularly at intervals of 2 nm or more.

Thus, the conventional silica gel has such an irregular structure, and accordingly the pores involved in the irregular structure exhibits a heterogeneous pore diameter distribution. Whereas, due to the reflection of the regularity in the cyclic structure, the novel porous substance employed by the present adsorption heat pump has pores which exhibit a homogeneous pore diameter distribution.

The porous substance employed by the present adsorption pump is preferably used in a form of granule. It can be granulated by a variety of processes, for example, by pressurized pulverizing, and by mixing with liquid and thereafter drying. However, the process for granulating the porous substance is not limited to these in particular. Note that an appropriate binder can be added to the porous substance.

When the porous substance is an oxide, the composition of the porous support can be equivalent to that of silicon oxide. Moreover, the composition of the porous substance can be that of silicon oxide with at least one of the following elements added: aluminum (Al), titanium (Ti), magnesium (Mg), zirconium (Zr), gallium (Ga), beryllium (Be), yttrium (Y), lanthanum (La), tin (Sn), lead (Pb), vanadium (V), and boron (B).

A process for synthesizing a meso-porous substance out of a layer silicate will be hereinafter described. For example, the layer silicate can preferably be kanemite ($NaHSi_2O_5.3H_2O$). In addition to kanemite, the layer silicate can be the following compounds: sodium disilicate crystal ($Na_2Si_2O_5$), makatite ($Na_2Si_4O_9.5H_2O$), ilerite ($Na_2Si_8O_{17}.xH_2O$), magadiite ($Na_2Si_{14}O_{29}.xH_2O$), and kenyaite ($Na_2Si_{20}O_{41}.xH_2O$). Note that, however, the layer silicate is not confined to these examples.

The surfactant is preferably chlorides, bromides, and iodides of the following alkylammonium compounds: alkyltrimethylammonium, dimethylalkylammonium, alkylammonium, and benzilmethylammonium.

First of all, a layer silicate is dispersed in a solvent in which a surfactant is dissolved. The solvent is preferably water. In addition to water, a water-alcohol mixture solvent, and the other solvents can be used. The concentration of an aqueous solution of the surfactant is preferably from 0.05 to 1M. When kanemite is used for the layer silicate, the amount of kanemite to be added is preferably from 5 to 200 g with respect to 1,000 ml of 0.1M surfactant aqueous solution. The dispersion can be heated at a temperature of from 30° to 150° C. for 3 hours or more. In the heating operation, the dispersion may be stirred, or it may not be stirred. In addition, it is not necessary to control the pH of the dispersion. However, a meso-porous substance of high crystallinity and heat-resistance is preferably prepared in the following manner: namely; first, the pH of the dispersion is increased to a higher value (e.g., 10 or more), and then the dispersion is heated. Thereafter, the pH of the dispersion is decreased to 9 or less, and then the dispersion is further heated. After the heating operation of the dispersion is completed, the resultant solid product is collected by filtering. A meso-porous substance of higher heat-resistance is prepared by washing the solid product with water repeatedly. After the washed solid product is dried, the dried solid product is preferably calcined at a temperature of 550° C. or more, further preferably in a temperature range of from 550° to 700° C. Alternatively, the washed solid product can be treated with a hydrochloric acid-ethanol mixture solution. This removes the surfactant from the crystals of the solid product to obtain a pure meso-porous substance. Note that the calcining operation is preferably carried out by heating the solid product in air, oxygen atmosphere, or nitrogen atmosphere for 1 hour or more, further preferably for 1 to 10 hours.

(On Determination of Pore Diameter Distribution Curve)

The term, "pore diameter distribution curve", herein means a curve which is obtained by plotting differential values (dV/dD) against pore diameters (D). The differential values (dV/dD) are calculated by differentiating pore volumes (V) by pore diameters (D). The pore diameter distribution curve is prepared, for example, by the gas adsorption method hereinafter described. In the gas adsorption method, the gas, which is used most frequently, is nitrogen.

According to the gas adsorption method, a nitrogen gas is first introduced into an adsorbent at the liquid-nitrogen temperature (e.g., −196° C.). Then, the adsorption amount is determined by the volumetric method or the gravimetrical method. For instance, the pressure of a nitrogen gas to be introduced into a porous adsorbent is increased gradually, and the adsorption amounts of the nitrogen gas are plotted against equilibrium pressures. Thus, an adsorption isotherm is prepared.

The above-described pore diameter distribution curve can be derived from the resulting adsorption isotherm, for example, by the Cranston-Inklay method, or the Pollimore-Heal method.

In the present heat adsorption pump, the porous adsorbent exhibits a pore diameter distribution curve in which some of the pores have a pore diameter falling in a pore diameter range of ±40% of the maximum peak of the pore diameter distribution curve, and the summed volume of such pores occupies 60% or more with respect to the total volume of all the pores. This arrangement can be summarized as hereinafter described. When the maximum peak be 2.7 nm in a pore diameter distribution curve, the summed volume of the pores, having a pore diameter falling in a pore diameter range of from 1.62 to 3.78 nm (i.e., ±40% of the peak diameter), occupies 60% or more with respect to the total volume of all the pores. More specifically, the integral value integrated over the pore diameter range of from 1.62 to 3.78 nm in the pore diameter distribution curve occupies 60% or more with respect to the total integral value integrated over the entire pore diameter range in the pore diameter distribution curve.

As described above, similarly to the aforementioned adsorbent "B", when the porous substances exhibit a pore diameter distribution curve in which some of the pores have a pore diameter falling in a pore diameter range of ±40% of the maximum peak of the pore diameter distribution curve, and the summed volume of such pores occupies less than 60% with respect to the total volume of all the pores, an adsorption heat pump requires a large temperature difference to operate, resulting in a poor energy efficiency. Such porous substances are undesirable as an adsorbent for the present adsorption heat pump.

Figure 6:
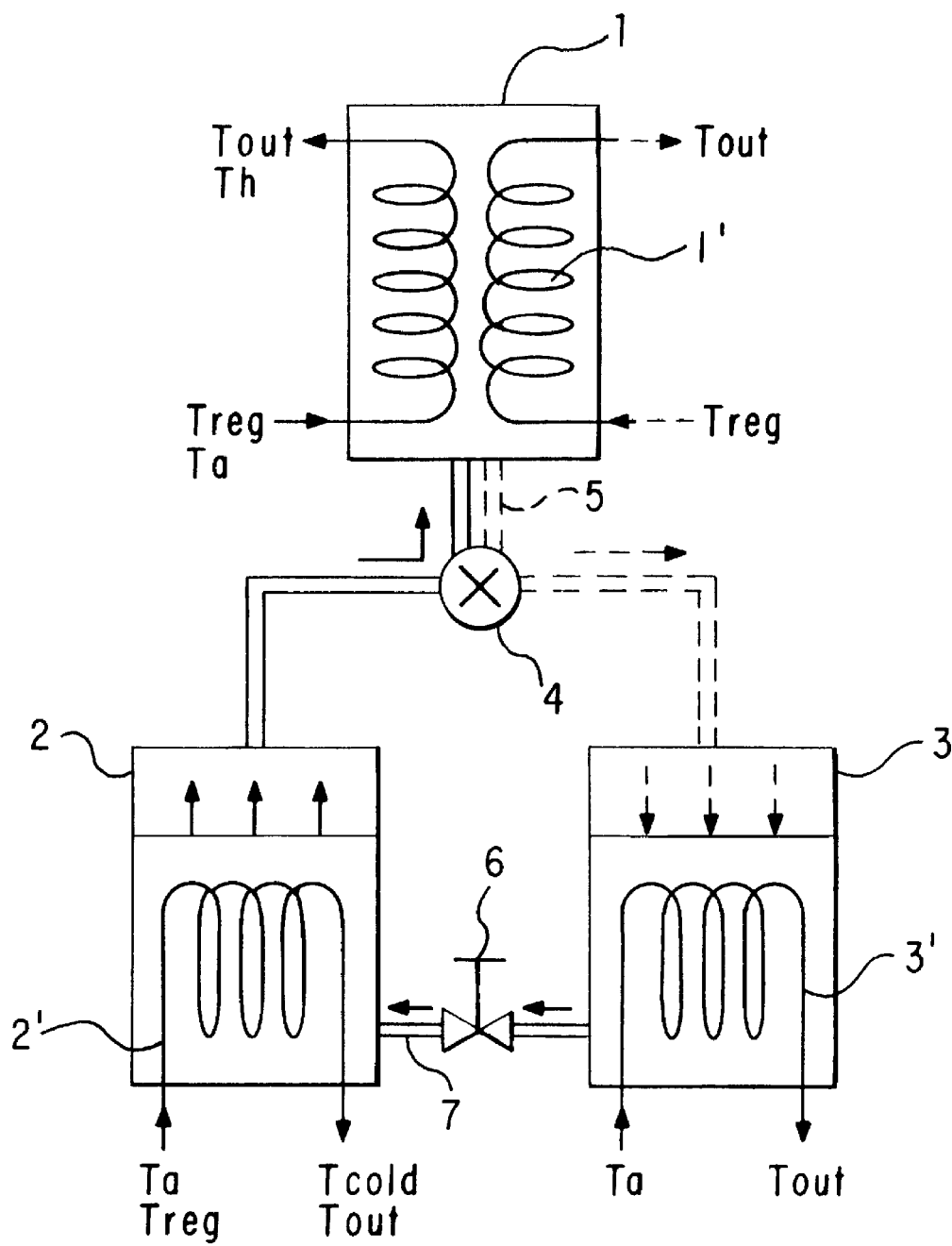
FIG. 6 is a block diagram for describing the operation principle of adsorption heat pumps.

The present adsorption heat pump employing the novel adsorbent can be applied to an open system, or an enclosed system. FIG. 6 illustrates an operating principle of one of the enclosed system adsorption heat pumps to which the present adsorption heat pump is applied. As illustrated in FIG. 6, an example of the present adsorption heat pump communicates with an adsorption unit 1, an evaporation unit 2, a condensation unit 3 through a valve 4 and piping 5. Piping 7 is disposed between the evaporation unit 2 and the condensation unit 3 by way of a valve 6. Thus, this example is constructed so that it can be operated continuously.

The operations of the thus constructed example will be hereinafter described. The valve 4 is switched in order to introduce a vapor-state working fluid into the adsorption unit 1 from the evaporation unit 2 by way of the piping 5, and thereby a novel adsorbent adsorbs the vapor-state working fluid. The desorption of the adsorbed working fluid is carried out by flowing water having a temperature of $T_{reg}$ into a heat exchanger 1' of the adsorption unit 1. The desorbed working fluid is then transferred to the condensation unit 3 by way of the piping 5, and is condensed at the condensation unit 3 accordingly. There are two heat sources, eg., a low-temperature heat source having a temperature of $T_a$, and a high-temperature heat source having a temperature of $T_{reg}$. Note that $T_a < T_{reg}$.

The two heat sources increase and decrease the temperature of the adsorbent, thereby carrying out the adsorption-desorption cycle repeatedly. Moreover, the cold temperature $T_{cold}$ is generated from an endothermic heat at the evaporation unit 2, and the hot temperature $T_h$ is generated from an adsorption heat at the adsorption unit 1, respectively. The example of the present adsorption heat pump is thus operated.

As having been described so far, the present adsorption heat pump employs a novel adsorbent (e.g., a novel meso-porous substance) whose pores have a pore diameter falling in a predetermined range and exhibit a prescribed pore diameter distribution. The novel meso-porous substance shows such a large pumping heat quantity (e.g., one of the performance indexes as an adsorbent for adsorption heat pumps) that an adsorption heat pump can exhibit a large pumping temperature difference. Moreover, the novel meso-porous substance is also good in terms of the temperature difference required for regeneration. Therefore, the novel meso-porous substance enables a heat source of a low temperature and a small temperature difference to operate adsorption heat pumps. Thus, from this viewpoint as well, the novel meso-porous substance is a useful adsorbent for adsorption heat pumps.

First Preferred Embodiment
Meso-Porous Substance Preparation No. 1
(Preparation of "FSM/8", "FSM/10", "FSM/12", "FSM/14", and "FSM/16")

Powdered sodium silicate was calcined in air at 700° C. for 6 hours, and was thereby crystallized to sodium disilicate (i.e., $\delta$-$Na_2Si_2O_5$). The powdered sodium silicate was produced by NIHON KAGAGU KOGYO Co., Ltd., and included $SiO_2$ and $Na_2O$ in a molar ratio of 2.00 (i.e., $SiO_2$/$Na_2O$=2.00). The sodium disilicate crystal was weighed out by 50 g, and was dispersed in 500 ml water. The dispersion was stirred for 3 hours, and was thereafter filtered to collect the solid content. Crystalline kanemite was thus prepared. The resulting kanemite was dried, and was weighed out by 50 g. The kanemite was then dispersed in a 1,000 ml hexadecyltrimethylammonium chloride ($C_{16}H_{33}N(CH_3)_3Cl$) aqueous solution whose concentration was 0.1M. The dispersion was heated at 70° C. while stirring for 3 hours. When the heating was started, the pH of the dispersion was 12.3. After stirring and heating the dispersion at 70° C., the pH of the dispersion was decreased to 8.5 by adding a 2N HCl aqueous solution. Thereafter, the dispersion was further heated at 70° C. for 3 hours, and was then left to cool to room temperature. The resultant solid product was filtered, and was dispersed and stirred in 1,000 ml deionized water. This filtering, dispersing and stirring operation was repeated 5 times. Then, the resulting solid product was dried at 60° C. for 24 hours. Finally, the dried solid product was heated at 450° C. for 3 hours, and was thereafter calcined in air at 550° C. for 6 hours to prepare a meso-porous substance "FSM/16".

Moreover, 4 meso-porous substances "FSM/8", "FSM/10", "FSM/12", and "FSM/14" were prepared in the same manner. In the preparation of these extra 4 meso-porous substances, instead of the hexadecyltrimethylammonium chloride, the following alkyltrimethylammonium ($C_nH_{2n+1}N(CH_3)_3$) chloride or bromide was used: namely; alkyltrimethylammonium ($C_nH_{2n+1}N(CH_3)_3$) chloride or bromide was used, which had an alkyl ($C_nH_{2n+1}$) group whose carbon-chain length was different from that of hexadecyltrimethylammonium chloride (or included a different number (n) of carbon atoms from that of hexadecyltrimethylammonium chloride). Specifically, alkyltrimethylammonium ($C_nH_{2n+1}N(CH_3)_3$) bromide, in which the number (n) of carbon atoms was 8, 10, and 12 (i.e., n=8, 10, and 12) in the alkyl group, was used to prepare a meso-porous substance "FSM/8", "FSM/10", and "FSM/12", respectively, and alkyltrimethylammonium ($C_nH_{2n+1}N(CH_3)_3$) chloride, in which the number (n) of carbon atoms was 14 (i.e., n=14) in the alkyl group, was used to prepare a meso-porous substance "FSM/14". Thus, the resultant 5 meso-porous substances were identified with the number (n) of carbon atoms in the alkyl group of the employed surfactant (i.e., alkyltrimethylammonium chloride or bromide).

Meso-Porous Substance Preparation No. 2
(Preparation of "FSM/M05", "FSM/M10", and "FSM/M20")

Meso-porous substances "FSM/M05", "FSM/M10", and "FSM/M20" were prepared under the similar conditions to those of Meso-Porous Substance Preparation No. 1 except for the addition of mesitylene. The mesitylene was added in the hexadecyltrimethylammonium chloride aqueous solution, and kanemite was dispersed in the mixture solution of hexadecyltrimethyl ammonium chloride and mesitylene. An amount of mesitylene added was 0.05M, 0.1M, and 0.2M per 0.1M hexadecyltrimethyl ammonium chloride to prepare the meso-porous substances "FSM/M05", "RFSM/M10", and "FSM/M20", respectively. Thus, the resulting 3 meso-porous substances were identified with the concentration of the employed mesitylene aqueous solutions.

(Structural Analysis on Meso-Porous Substances)

Figure 7:
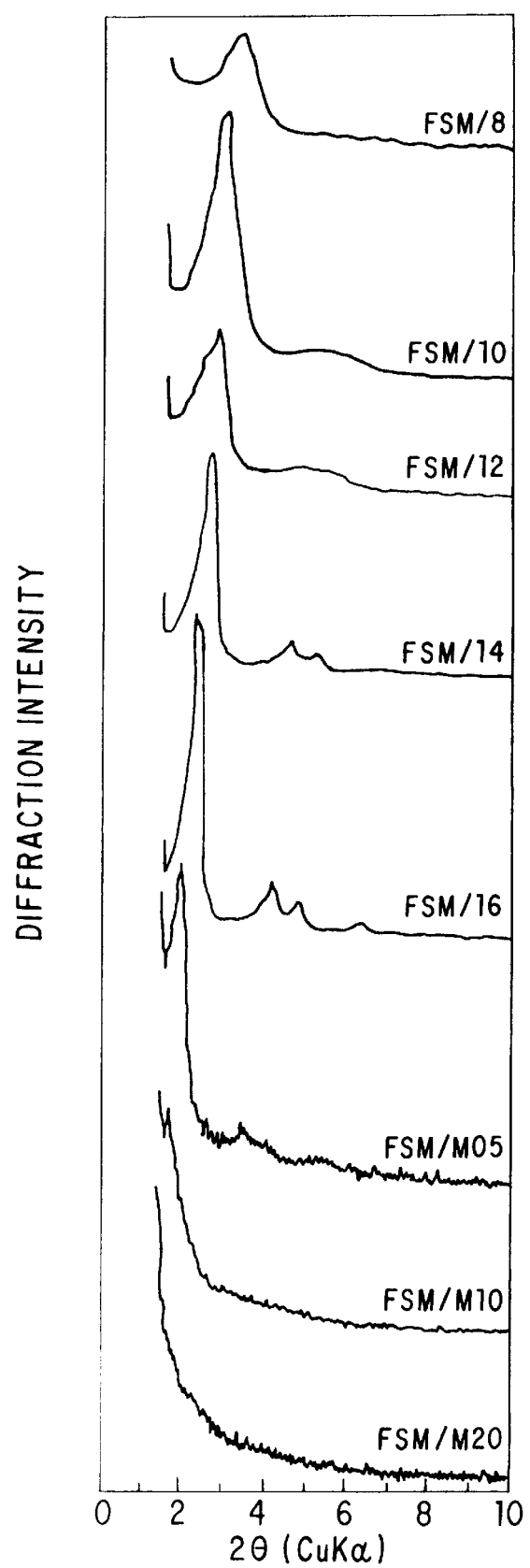
FIG. 7 illustrates the X-ray diffraction patterns which were exhibited by meso-porous substances prepared in the First Preferred Embodiment of the present invention.
Figure 8:
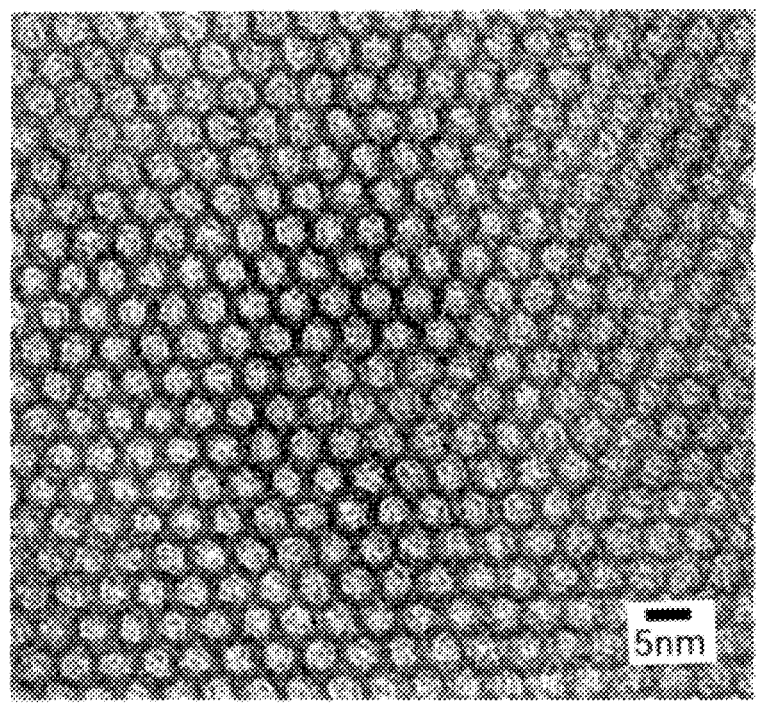
FIG. 8 is a picture on the pore-structure of one of the meso-porous substances prepared in the First Preferred Embodiment of the present invention, the picture which was taken by a transmission electron microscope to show a pore diameter distribution of the meso-porous substance.

The thus synthesized powder of the meso-porous substances was subjected to an X-ray diffraction analysis, and to a transmission-electron-microscope analysis, and the resultant X-ray diffraction patterns and photographs were observed. In the X-ray diffraction analysis, a "RIGAKU RAD-B" analyzer was used. The analyzer employed CuK α as an X-ray source, and scanned a test specimen by 2 degrees per minute (2 Θ)/min.). Note that the slit width of the analyzer was 1 degree-0.3 mm-1 degree. FIG. 7 illustrates the results of this X-ray diffraction analysis. In the transmission-electron-microscope analysis, photographs were taken by a transmission electron microscope "JEOLJEM-200CX" in which electrons were accelerated at a voltage of 200 kV. FIG. 8 is one of the photographs thus prepared.

As can be seen from the X-ray diffraction patterns illustrated in FIG. 7, the meso-porous substances "FSM/12", "FSM/14", "FSM/16", and "FSM/M05" were observed to exhibit three to four diffraction peaks in a diffraction-angle range of 10 deg. or less. The peaks could be indexed to a hexagonal lattice. Whilst, the meso-porous substances "FSM/8", "FSM/10", and "FSM/M10" were observed to exhibit one to two diffraction peaks in a diffraction-angle range of 10 deg. or less. Moreover, the meso-porous substance "FSM/M20" was not observed to exhibit any appreciable peaks in a diffraction-angle range of 1 deg. or more. According to these results of the analysis on these X-ray diffraction patterns, these meso-porous substances were found to have a regular structure.

FIG. 8 is a photograph of the meso-porous substance "FSM/16" taken by the transmission electron microscope, and shows the pore diameter distribution in the meso-porous substance "FSM/16". It is evident from the photograph that pores having a pore diameter of 2.8 nm were arranged regularly to constitute a honeycomb-shaped structure.

(Determination of Pore Diameter Distribution Curve of Meso-Porous Substances)

Figure 9:
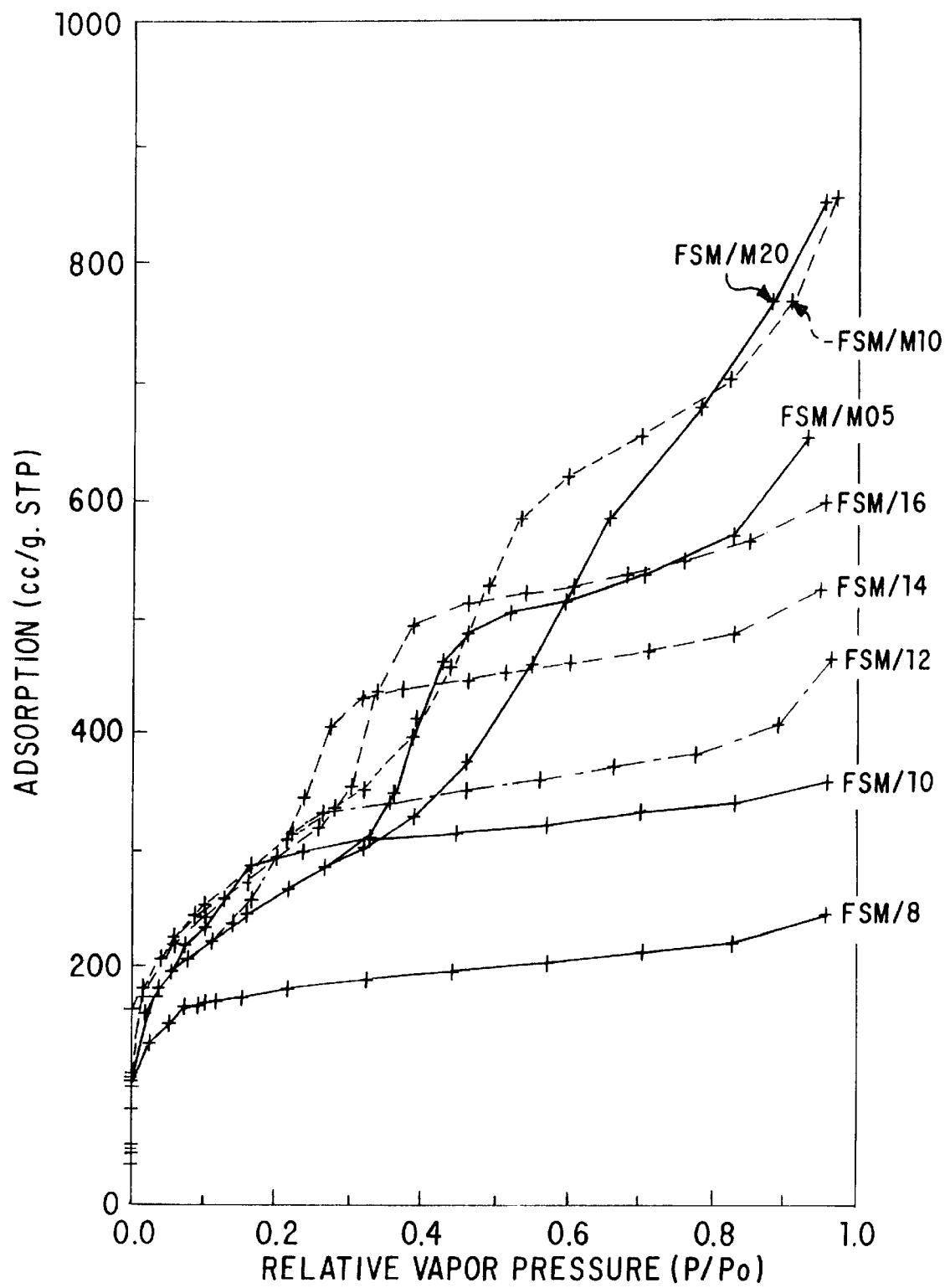
FIG. 9 illustrates the nitrogen adsorption isotherms which were exhibited by the meso-porous substances prepared in the First Preferred Embodiment of the present invention.

The pore diameter distribution curves exhibited by the aforementioned meso-porous substances were determined in accordance with a nitrogen adsorption isotherm. The nitrogen adsorption isotherm was measured in the following manner. The apparatus included a vacuum line which was provided with a pressure sensor and two control valves. The pressure sensor was "Baratron 127AA" made by MKS, and its upper detectable range was 1,000 mmHg. The control valves were "248A" made by MKS. A nitrogen gas could be automatically introduced into the vacuum line, and into a sample tube to be connected with the vacuum line via one of the control valves. In the calibration, a sample of the aforementioned meso-porous substances was weighed out by about 40 mg, and was put in a sample tube made of glass. The sample tube was connected with the vacuum line via one of the control valves, and the sample tube was degassed to vacuum at room temperature for about 2 hours. The vacuum reached was $10^{-4}$ mmHg. The sample tube was then immersed into liquid nitrogen. Then, a nitrogen gas having a predetermined pressure was introduced into the vacuum line. After the pressure was stabilized in the vacuum line, the control valve connected with the sample tube was opened. After the pressure become constant in the vacuum line, an equilibrium pressure was recorded. The above-described operations were carried out repeatedly to obtain 16 to 18 data in an equilibrium-pressure range of from 0 to 760 mmHg. The time required for reaching equilibrium was in the range of 20 to 60 minutes depending on the pressure of the nitrogen gas to be introduced. The resultant equilibrium-pressure data and the adsorption amounts derived from the pressure variation were plotted to prepare a nitrogen adsorption isotherm for each of the meso-porous substances. FIG. 9 illustrates the results of the nitrogen-adsorption-isotherm measurement.

Figure 10:
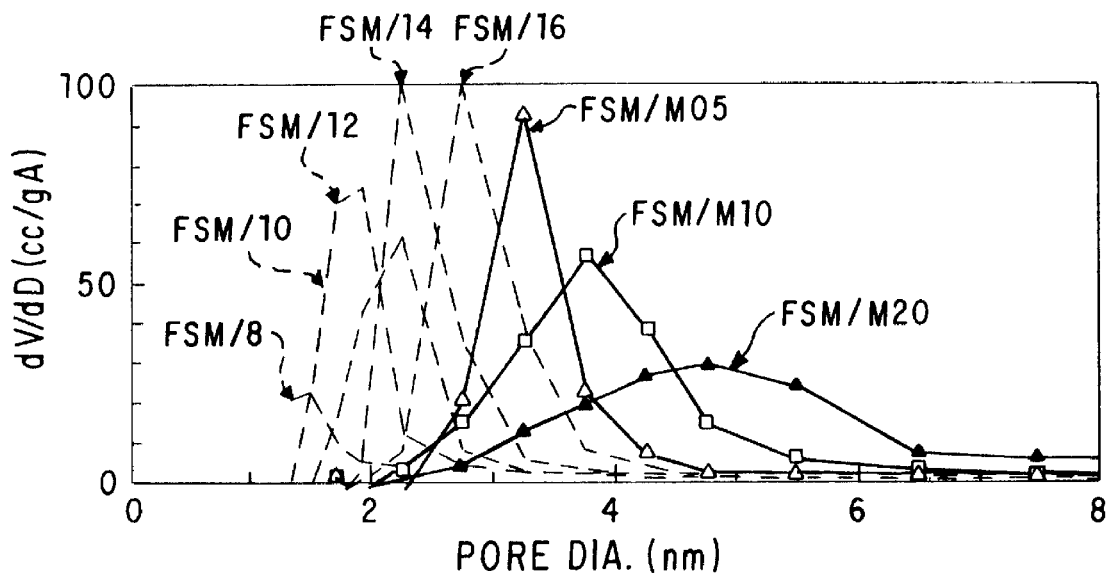
FIG. 10 is a graph for illustrating the pore diameter distribution curves which were exhibited by the meso-porous substances prepared in the First Preferred Embodiment of the present invention, the graph which is determined based on FIG. 9.

Based on the nitrogen adsorption isotherms shown in FIG. 9, pore diameter distribution curves of the aforementioned 8 meso-porous substances were determined by the Cranston-Inklay method. FIG. 10 illustrates the results of the determination. The following physical properties were derived from FIG. 10: namely; a pore diameter giving the maximum peak in the pore diameter distribution curves (hereinafter referred to as a "central pore diameter"), a total volume of all the pores involved in the meso-porous substances, and a proportion of a summed volume of pores, having a pore diameter falling in a range of ±40% of the central pore diameter, with respect to the total volume of all the pores (hereinafter referred to as a "±40% pore proportion"). Table 1 below summarizes these physical properties.

TABLE 1

| Preparation No. | Identification | Central Pore Diameter (nm) | Total Volume of All Pores (ml/g) | ±40% Pore Proportion (%) |
|---|---|---|---|---|
| No. 1 | FSM/8 | 1.5 | 0.26 | 61 |
|  | FSM/10 | 1.9 | 0.51 | 77 |
|  | FSM/12 | 2.3 | 0.65 | 73 |
|  | FSM/14 | 2.3 | 0.85 | 80 |
|  | FSM/16 | 2.8 | 1.04 | 64 |
| No. 2 | FSM/M05 | 3.2 | 1.03 | 68 |
|  | FSM/M10 | 3.6 | 1.20 | 63 |
|  | FSM/M20 | 4.7 | 1.22 | 60 |
| Comp. Ex. | Silica Gel | 2.3 | 0.46 | 35 |
|  | Activated Carbon | 2.3 | 0.63 | 56 |
|  | Zeolite | 0.5 | 0.16 | >90 |

It is apparent from Table 1 that all of the meso-porous substances prepared by Preparation Nos. 1 and 2 had a central pore diameter which fell in a range of from 1 to 10 nm, and that their ±40% pore proportions were 60% or more.

Figure 11:
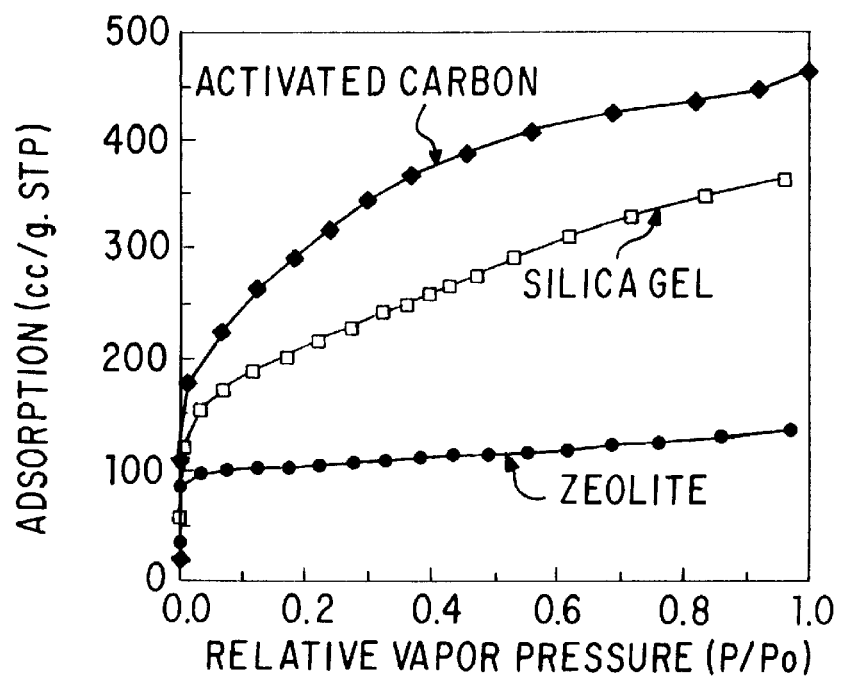
FIG. 11 illustrates the nitrogen adsorption isotherms which were exhibited by comparative examples (e.g., activated carbon, silica gel, and zeolite)
Figure 12:
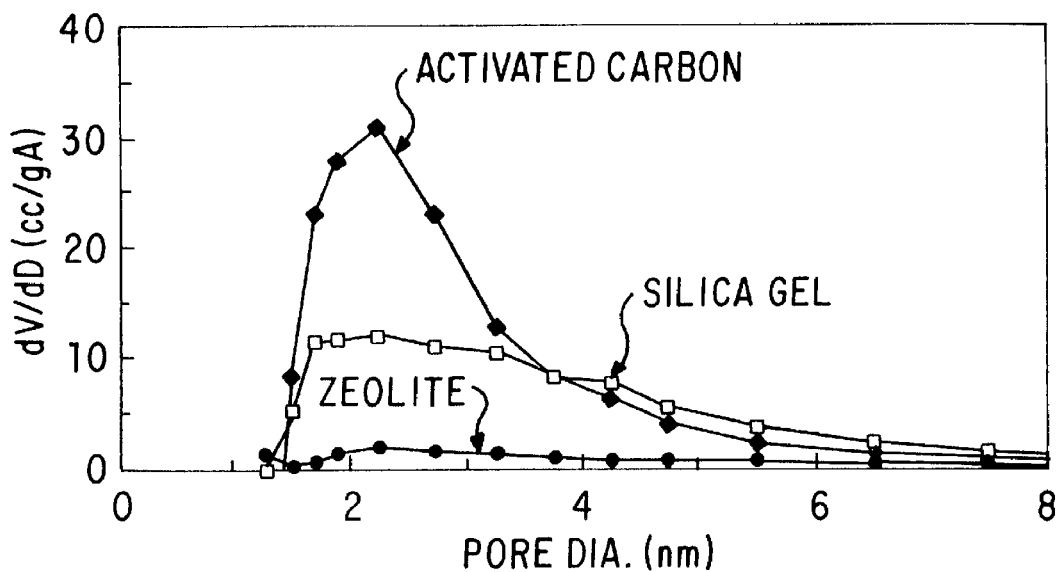
FIG. 12 is a graph for illustrating the pore diameter distribution curves which were exhibited by the comparative examples, the graph which is determined based on FIG. 11.

Moreover, as comparative examples, a nitrogen adsorption isotherm was calibrated for a commercially available type "A" silica gel, an activated carbon "Kurare D7", and a zeolite "ZSM-5" in the aforementioned manner. FIG. 11 illustrates the resultant nitrogen adsorption isotherms. Based on the nitrogen adsorption isotherms, a pore diameter distribution curve was determined therefor as described above. FIG. 12 illustrates the resulting pore diameter distribution curves. Similarly, a central pore diameter of the comparative examples, a total volume of all the pores involved therein, and a ±40% pore proportion thereof were derived from the pore diameter distribution curves. Table 1 above also recites the physical properties of the comparative examples.

It is understood from Table 1 that the silica gel and activated carbon had a central pore diameter which fell in the range specified by the present invention, but that their ±40% pore proportions were less than 60% to exhibit broad pore diameter distributions. Whilst, the zeolite exhibited 60% or more in terms of ±40% pore proportion, but had an extremely small central pore diameter of 0.5 nm.

Second Preferred Embodiment (Densifying Meso-Porous Substances)

Advantages resulting from an increased packing density of porous substances will be hereinafter described. For instance, in this Second Preferred Embodiment, a powder of a meso-porous-substance powder was pressurized by the cold isostatic press (CIP).

As test specimens, the same meso-porous substances "FSM/10" and "FSM/16" as prepared in Preparation No. 1 of the First Preferred Embodiment were also employed. Note that, however, the meso-porous substances "FSM/10" and "FSM/16" of the Second Preferred Embodiment were those prior to the final stage of Preparation No. 1 of the First Preferred Embodiment. Specifically, the meso-porous substances "FSM/10" and "FSM/16" of the Second Preferred Embodiment were not subjected to the final heating and calcination processes which were carried out in the nitrogen gas, and in air, respectively. Thus, the organic surfactants (i.e., octadecyltrimethylammonium bromide, and hexadecyltrimethylammonium chloride) were resided in the pores of the meso-porous substances "FSM/10", and "FSM/16", respectively.

Each of the powdered test specimens was enclosed in a polyvinyl chloride bag, and was pressurized at a pressure of from 500 kgf/m$^2$ to 9,500 kg/m$^2$ by a static-hydraulic-pressure pressing machine for 1 minute. Each of the pressurized test specimens was pulverized in a mortar, and was then passed through a sieve having a mesh size of 0.25 mm, and a sive having a mesh size of 0.5 mm. Thus, each of the test specimens was controlled to have a particle diameter of from 0.25 to 0.5 mm. Finally, each of the resulting test specimens was calcined in air at 550° C. for 6 hours to remove the residual organic components. The volume and weight of the thus prepared test specimens were measured by a graduated measuring cylinder and an weight meter, and a packing density thereof was calculated. Table 2 below sets forth the packing densities of the test specimens made by pressurizing the meso-porous substance "FSM/10" at various pressures. Whilst, Table 3 below sets forth the packing densities of the test specimens made by pressurizing the meso-porous substance "FSM/16" at various pressures.

TABLE 2

| Pressure (kgf/m$^2$) | Packing Density (g/ml) |
|---|---|
| 0 | 0.30 |
| 500 | 0.31 |
| 1,000 | 0.35 |
| 1,500 | 0.38 |
| 2,000 | 0.43 |
| 2,500 | 0.45 |
| 3,000 | 0.47 |
| 5,000 | 0.78 |

TABLE 3

| Pressure (kgf/m$^2$) | Packing Density (g/ml) |
|---|---|
| 0 | 0.33 |
| 6,000 | 0.67 |
| 8,000 | 0.63 |
| 9,500 | 0.65 |

Figure 13:
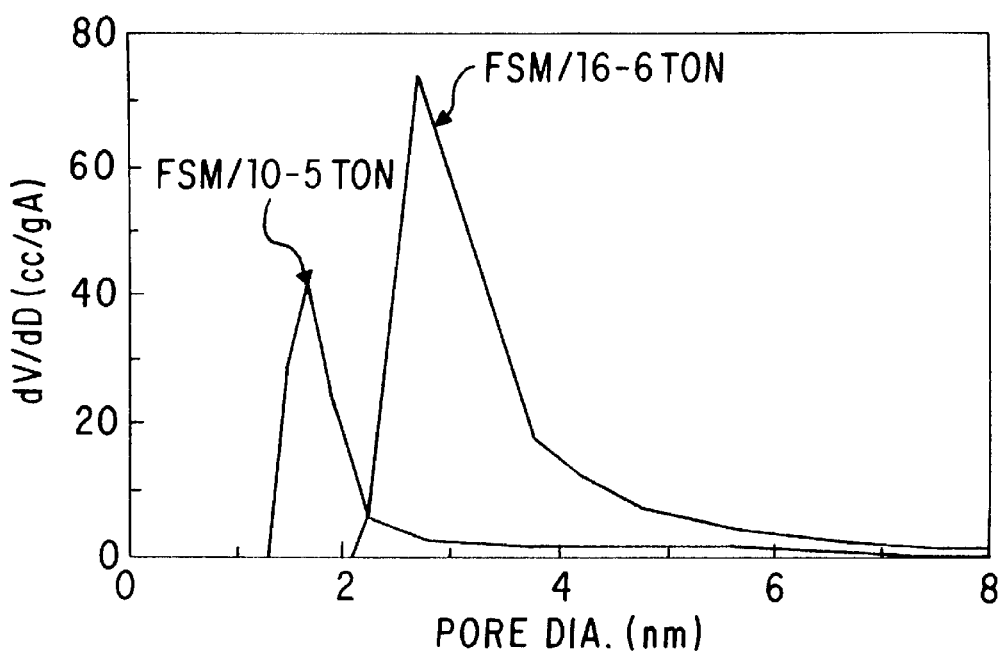
FIG. 13 is a graph for illustrating the pore diameter distribution curves which were exhibited by meso-porous substances prepared in the Second Preferred Embodiment of the present invention, the meso-porous substances which were densely packed.
Figure 14A:
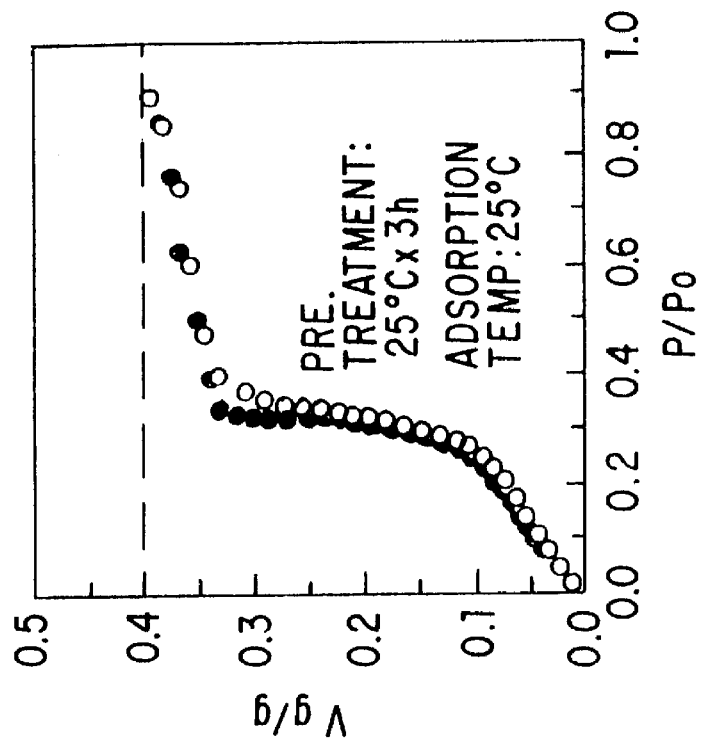
Figure 14B:
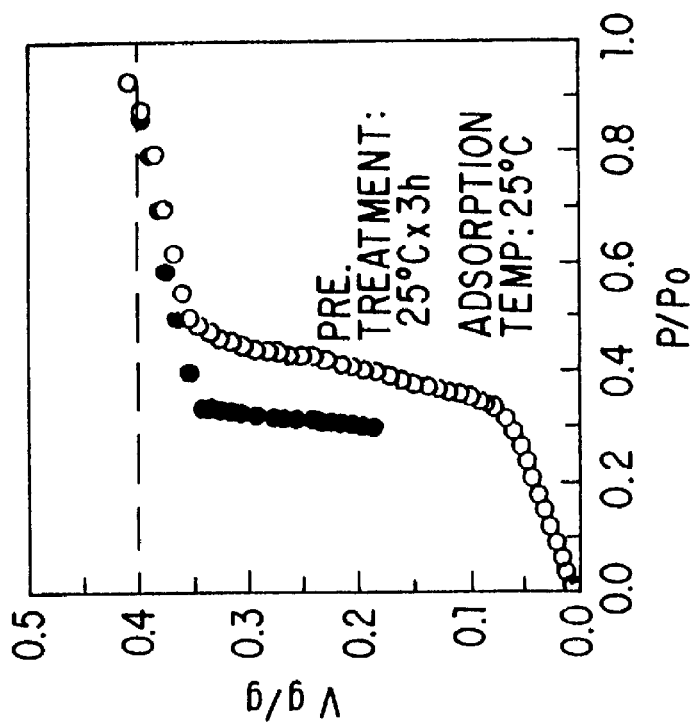
Figure 14D:
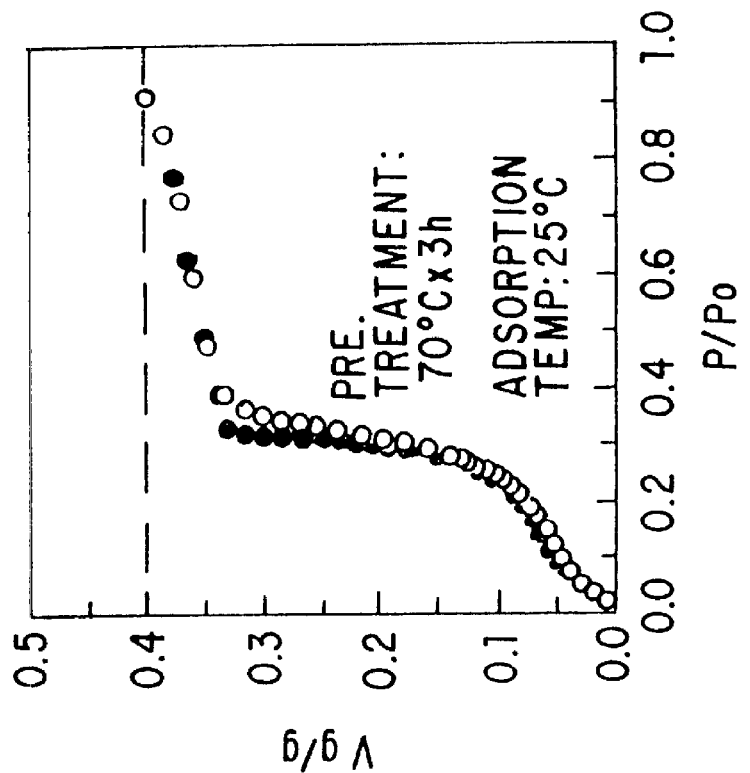
Figure 14C:
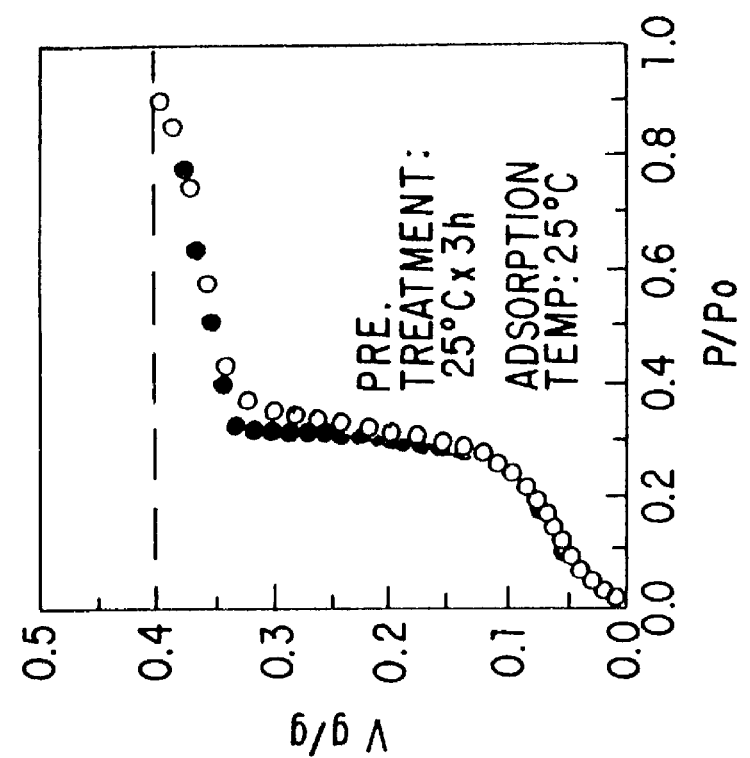

It is appreciated from Table 2 that the test specimen made by pressurizing the meso-porous substance "FSM/10" at 5,000 kgf/m$^2$ exhibited a packing density of 0.78 g/ml, which was more than twice that of the test specimen not subjected to the pressing operation. FIG. 13 illustrates a pore diameter distribution curve of the test specimen made by pressurizing the meso-porous substance "FSM/10" at 5,000 kgf/m$^2$, and a pore diameter distribution curve of the test specimen made by pressurizing the meso-porous substance "FSM/16" at 6,000 kgf/m$^2$. Thus, the test specimens were verified to exhibit a sharp pore diameter distribution curve, respectively.

In addition, the test specimen, made by pressurizing the meso-porous substance "FSM/10" at 5,000 kgf/m$^2$, was found to exhibit a central pore diameter of 1.9 nm, and a ±40% pore proportion of 71%. The test specimen, made by pressurizing the meso-porous substance "FSM/16" at 6,000 kgf/m$^2$, was found to exhibit a central pore diameter of 2.8 nm, and a ±40% pore proportion of 70%.

(Determination of Water-Vapor Adsorption Isotherm)

Figure 15B:
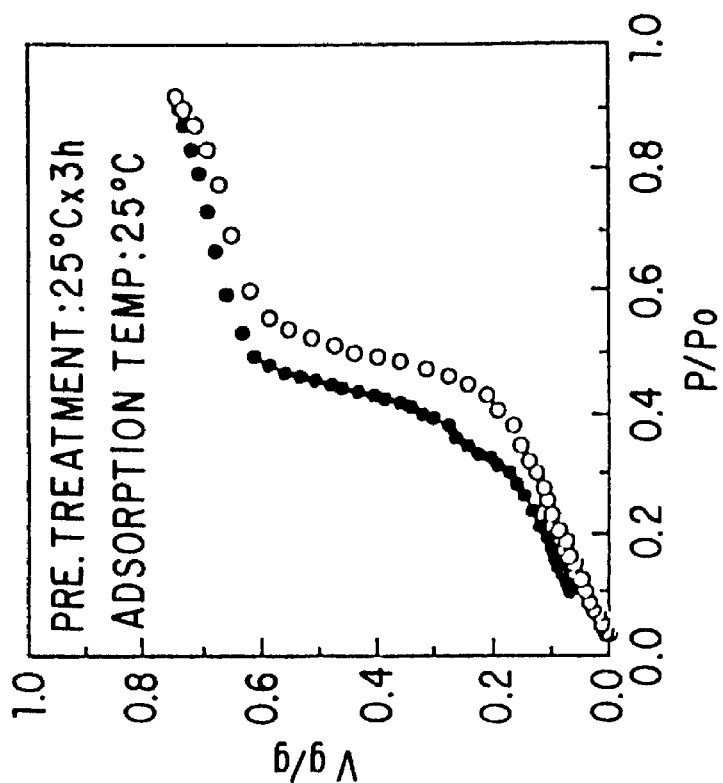
FIG. 15B illustrates a water-vapor adsorption isotherm at an adsorption temperature 25° C. of the "FSM/16" meso-porous substance subjected to the second preliminary treatment at 25° C. for 3 hours.
Figure 15A:
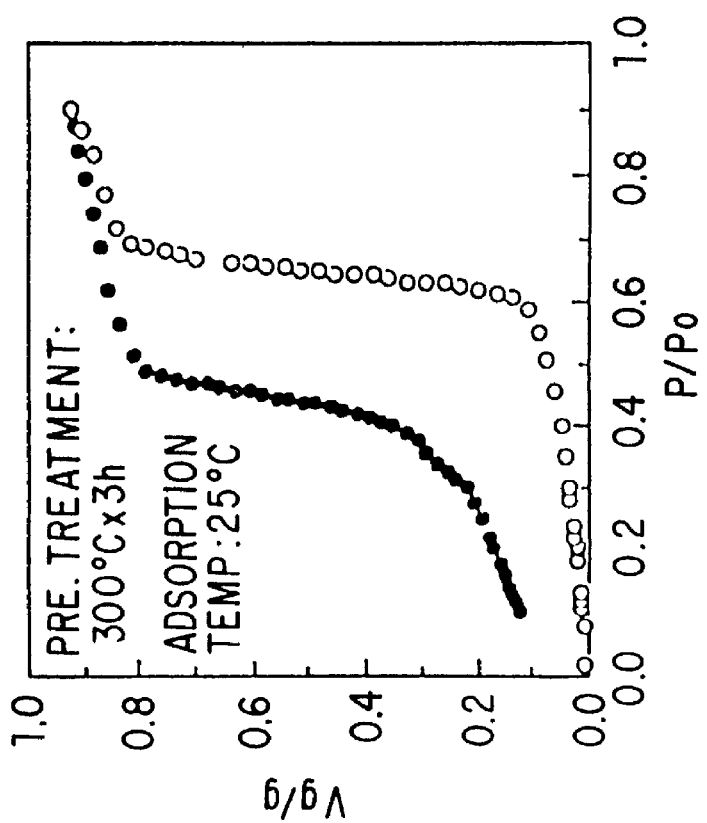
Figure 16A:
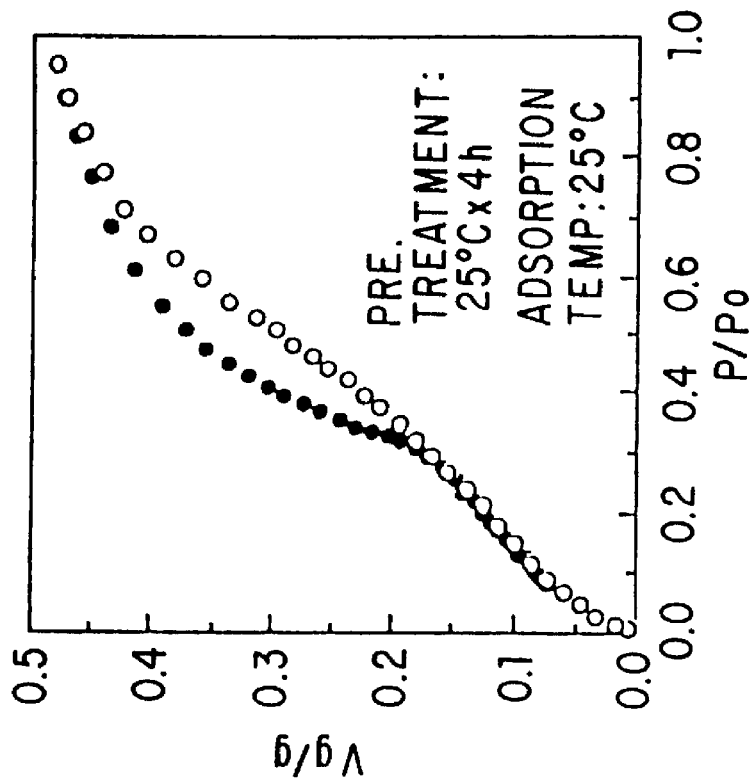
Figure 16B:
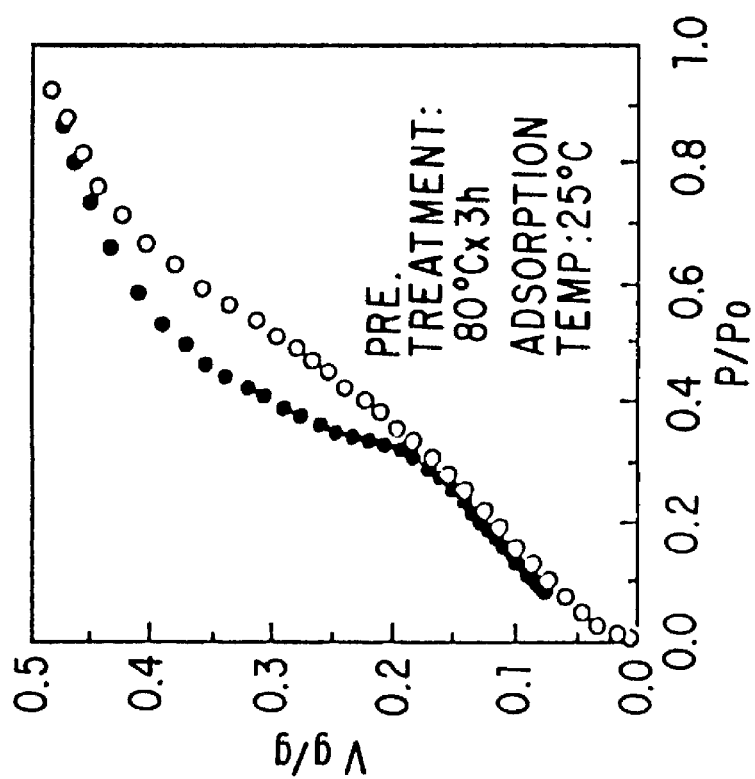
Figure 16C:
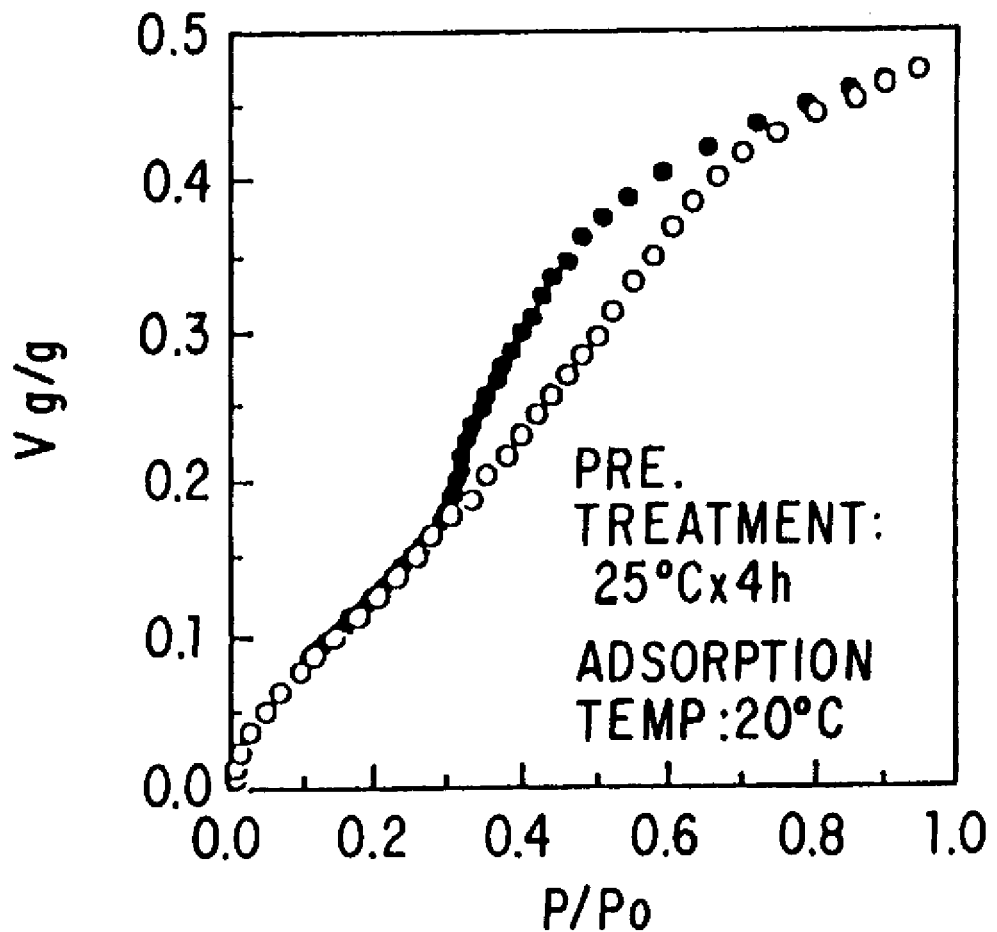

The water-vapor adsorption isotherms exhibited by the test specimens were determined by using a water-vapor adsorbing apparatus, "BELSORP 18", made by NIHON BELL Co., Ltd. In this determination of the water-vapor adsorption isotherms, the meso-porous substance "FSM/10" was pressed at 5,000 kg m$^2$, and was screened to have a particle diameter of from 0.25 to 0.5 mm. FIG. 14 illustrates the water-vapor adsorption isotherms exhibited by the meso-porous substance "FSM/10". The meso-porous substance "FSM/16" was pressed at 6,000 kgf/m$^2$, and was screened to have a particle diameter of from 0.25 to 0.5 mm. FIG. 15 illustrates the water-vapor adsorption isotherms exhibited by the meso-porous substance "FSM/16". For comparison, a commercially available type "A" silica gel having a particle diameter of from 0.1 to 0.15 mm was similarly examined for the water-vapor adsorption isotherms. FIG. 16 illustrates the water-vapor adsorption isotherms exhibited by the type "A" silica gel.

Note that one cycle of the water-vapor-adsorption-isotherm determination consisted of a determination of an adsorption isotherm, and a determination of a desorption isotherm. The cycle was repeatedly carried out for 2 to 4 times for each of the test specimens, thereby determining an adsorption isotherm and a desorption isotherm for each cycle. Also note that, before carrying out each of the cycles, the test specimens were subjected to a variety of preliminary treatments which were carried out at a predetermined temperature for a prescribed time. The conditions of the preliminary treatments are incorporated in FIGS. 14, 15 and 16.

As can be seen from FIGS. 14 and 15, the test specimens, made from the meso-porous substances "FSM/10" and "FSM/16", showed a large hysteresis in their adsorption-desorption isotherms during the first cycle of the water-vapor-adsorption-isotherm determination. However, they showed a reduced hysteresis after the second cycle of the water-vapor-adsorption-isotherm determination. This phenomenon is believed to have resulted from the hydration occurred on the surface of the test specimens (i.e., the meso-porous substances "FSM/10" and "FSM/16") during the adsorption in the first cycle. After the second cycle, they exhibited a substantially identical adsorption-desorption isotherm. Accordingly, it is possible to regard the adsorption-desorption isotherms, which were determined in the second cycle and thereafter, as reference data.

On the other hand, as illustrated in FIG. 16, a comparative test specimen, the type "A" silica gel, exhibited a substantially identical adsorption-desorption isotherm during the first, second and third cycles of the water-vapor-adsorption-isotherm determination.

According to the resultant water-vapor isotherms, a maximum variation of adsorption per unit weight of the test specimens (g/g), and a maximum variation of adsorption per unit volume thereof (g/ml) were calculated for the test specimens. Note that the maximum variations of adsorption were determined with respect to a relative vapor pressure ($P/P_o$) variation of 0.2. Table 4 below summarizes the results of this calculation. In addition to the maximum variations of adsorption, Table 4 sets forth the packing densities of the test specimens, and the ranges of the relative vapor pressure over which the maximum variations of adsorption were determined. Moreover, the aforementioned literature (Fujio WATANABE, Toshifumi SUGIURA, Masanobu HASATANI, and Chisato MARUMO, Chemical Engineering Papers, Vol. 15, No. 1, pp. 38–43 (1989)) disclosed water-vapor adsorption isotherms which were exhibited by a type "A" structural activated carbon, a type "B" structural activated carbon, a type "C" structural activated carbon, a type "D" structural activated carbon, a molecular-sieve carbon, and a type "B" silica gel. Accordingly, the same data, such as the maximum variations of adsorption, etc., were also calculated from the disclosed water-vapor adsorption isotherms therefor, and the results of the calculation are incorporated into Table 4 for comparison.

by the present adsorption heat pump, exhibited a superb maximum variation of adsorption per unit volume, 0.17 g/ml or more. Thus, they could be considered a good adsorbent for adsorption heat pumps. Whilst, the actual comparative example (e.g., the type "A" silica gel), and the comparative examples excerpted from the literature (eg., the type "A" structural activated carbon, and so on) exhibited an inferior maximum variation of adsorption per unit volume, 0.17 g/ml or less.

Moreover, in accordance with the calculation method disclosed in the aforementioned literature, a pumping heat quantity and a pumping temperature difference of the meso-porous substances "FSM/10" and "FSM/16" employed by the present adsorption heat pump were determined. The results of this determination are summarized in Table 5 below.

In Table 5, the pumping temperature difference, $\Delta T$, is expressed in two ways: namely; $\Delta T_c = T_a - T_{cold}$, and $\Delta T_h = T_h - T_{reg}$. The value, "$q_1 - q_2$", is a difference of adsorption amount, in which $q_1$ specifies an adsorption amount at beginning, and $q_2$ specifies an adsorption amount at completion. Similarly to the pumping heat quantity, the value, "$q_1 - q_2$", is one of the indexes on operation efficiency of adsorption heat pump. $\phi_1$, and $\phi_2$ are relative pressures corresponding to $q_1$ and $q_2$, respectively, and specify a lower applicable pressure and an upper applicable pressure of adsorbent.

TABLE 4

| Classification | Identification | Packing Density (g/ml) | Examined Relative Pressure ($P/P_o$) Range | Max. Variation of Adsorption | |
|---|---|---|---|---|---|
| | | | | per Weight (g/g) | per Volume (g/ml) |
| 2nd Pref. Embodiment | FSM/10 | 0.78 | 0.2–0.4 | 0.25 | 0.20 |
| | FSM/16 | 0.67 | 0.4–0.6 | 0.44 | 0.29 |
| Comp. Ex. | Type "A" Silica Gel | 0.70 | 0.4–0.6 | 0.14 | 0.10 |
| | Type "A" S.A.C.* | 0.263 | 0.3–0.5 | 0.12 | 0.032 |
| | Type "B" S.A.C.* | 0.241 | 0.3–0.5 | 0.16 | 0.039 |
| | Type "C" S.A.C.* | 0.121 | 0.2–0.4 | 0.21 | 0.025 |
| | Type "D" S.A.C.* | 0.255 | 0.5–0.7 | 0.58 | 0.15 |
| | Molecular-Sieve Carbon | 0.348 | 0.4–0.6 | 0.14 | 0.049 |
| | Type "B" Silica Gel | — | 0.0–0.2 | 0.15 | — |

Note (1): The data on the comparative examples marked with * are excerpted from the aforementioned literature.
Note (2): The abbreviation, "S.A.C.", stands for a "structural activated carbon".

It is evident from Table 4 that the meso-porous substances "FSM/10" and "FSM/16", the novel adsorbents employed

TABLE 5

| Classification | Identification | $\phi_1$ (—) | $\phi_2$ (—) | $q_1$ (kg/kg) | $q_2 - q_1$ (kg/kg) | $[q_2 - q_1]$ (kg/L) | $\Delta T_c$ (K) | $\Delta T_h$ (K) |
|---|---|---|---|---|---|---|---|---|
| 2nd Pref. Emodiment | FSM/10 | 0.26 | 0.38 | 0.12 | 0.22 | 172 | 15.9 | 22.5 |
| 2nd Pref. Emodiment | FSM/16 | 0.40 | 0.60 | 0.18 | 0.44 | 286 | 8.6 | 11.5 |
| Comp. Ex. | Type "A" Silica Gel | 0.10 | 0.70 | 0.18 | 0.34 | 238 | 6.1 | 7.9 |
|  | Type "A" S.A.C.* | 0.22 | 0.58 | 0.020 | 0.153 | 40 | 9.2 | 11.5 |
|  | Type "B" S.A.C.* | 0.22 | 0.57 | 0.045 | 0.199 | 48 | 10.8 | 12.6 |
|  | Type "C" S.A.C.* | 0.23 | 0.52 | 0.065 | 0.225 | 27 | 12.2 | 15.3 |
|  | Type "D" S.A.C.* | 0.46 | 0.73 | 0.002 | 0.618 | 158 | 6.8 | 8.4 |
|  | Molecular-Sieve Carbon | 0.39 | 0.62 | 0.002 | 0.191 | 66 | 9.5 | 11.9 |
|  | Type "B" Silica Gel | 0.21 | 0.85 | 0.155 | 0.148 | — | 4.0 | 4.2 |

Note (1): The data on the comparative examples marked with * are excerpted from the aforementioned literature.
Note (2): The abbreviation, "S.A.C.", stands for a "structural activated carbon".
Note (3): The bracketed $q_2 - q_1$ is converted from the not-bracketed $q_2 - q_1$ by substituting the unit, L, for the unit, kg.

It is apparent from Table 4 that the meso-porous substances "FSM/10" and "FSM/16", the novel adsorbents employed by the present adsorption heat pump, exhibited a large pumping heat quantity, and a wide pumping temperature difference, both of which were well balanced with each other. Hence, they could be justified to be a good adsorbent for adsorption heat pumps.

For example, the pumping temperature differences exhibited by the meso-porous substance "FSM/10" of the Second Preferred Embodiment is compared with those exhibited by the type "A" silica gel and the type "D" structural activated carbon of the comparative examples. The meso-porous substance "FSM/10" exhibited a pumping temperature difference $\Delta T_c$=15.9 K, and a pumping temperature difference $\Delta T_h$=22.5 K. On the other hand, the type "A" silica gel exhibited a pumping temperature difference $\Delta T_c$=6.1 K, and a pumping temperature difference $\Delta T_h$=7.9 K. The type "D" structural activated carbon exhibited a pumping temperature difference $\Delta T_c$=6.8 K, and a pumping temperature difference $\Delta T_h$=8.4 K. Thus, the pumping temperature differences exhibited by the meso-porous substance "FSM/10" were twice as much as, or more of those exhibited by the type "A" silica gel and the type "D" structural activated carbon. Thus, the meso-porous substance "FSM/10" employed by the present adsorption heat pump exhibited a large pumping heat quantity, and a large pumping temperature difference, both of which were well balanced with each other. Therefore, the meso-porous substance "FSM/10" apparently made a good adsorbent for adsorption heat pumps.

Having now fully described the present invention, it will be apparent to one of ordinary skill in the art that many changes and modifications can be made thereto without departing from the spirit or scope of the present invention as set forth herein including the appended claims.

What is claimed is:

1. An adsorption heat pump, comprising:
   a working fluid;
   an evaporation-condensation unit for evaporating and condensing said working fluid;
   an adsorption-desorption unit for adsorbing and desorbing vapor resulting from said working fluid, communicating with said evaporation-condensation unit; and
   an adsorbent disposed in said adsorption-desorption unit, being a porous substance having pores, and exhibiting a pore diameter distribution curve having a maximum peak in a pore diameter range of from 1 to 10 nm, the pores in the diameter range of ±40% of pore diameter at the maximum peak having pore volume of not less than 60% of whole pore volume of the porous substance.

2. The adsorption heat pump according to claim 1, wherein said adsorbent exhibits a maximum adsorption variation of 0.17 g/ml or more when a relative vapor pressure of said working fluid is varied by 0.2 in a water-vapor adsorption isotherm.

3. The adsorption heat pump according to claim 1, wherein said adsorbent includes inorganic oxide.

4. The adsorption heat pump according to claim 3, wherein said inorganic oxide includes silicon oxide.

5. The adsorption heat pump according to claim 4, wherein said silicon oxide is a meso-porous substance.

6. The adsorption heat pump according to claim 5, wherein said meso-porous substance is a meso-porous molecular sieve.

7. The adsorption heat pump according to claim 5, wherein said meso-porous substance is produced from a dispersion which includes a layer silicate and a surfactant.

8. The adsorption heat pump according to claim 7, wherein said layer silicate is at least one member selected from the group consisting of kanemite ($NaHSi_2O_5 \cdot 3H_2O$), sodium disilicate crystal ($Na_2Si_2O_5$), makatite ($Na_2Si_4O_9 \cdot 5H_2O$), ilerite ($Na_2Si_8O_{17} \cdot xH_2O$), magadiite ($Na_2Si_{14}O_{29} \cdot xH_2O$), and kenyaite ($Na_2Si_{20}O_{41} \cdot xH_2O$).

9. The adsorption heat pump according to claim 7, wherein said surfactant is at least one member selected from the group consisting of chlorides, bromides, and iodides of an alkylammonium compound.

10. The adsorption heat pump according to claim 9, wherein said alkylammonium compound is at least one member selected from the group consisting of alkyltrimethylammonium, dimethylallylammonium, alkylammonium, and benzilmethylammonium.

11. The adsorption heat pump according to claim 7, wherein said meso-porous substance produced from the dispersion is further calcined in air, oxygen atmosphere, or nitrogen atmosphere at a temperature of 50° C. or more for 1 hour or more.

12. The adsorption heat pump according to claim 1 further comprising a low-temperature heat source, and a high-temperature heat source.

13. The adsorption heat pump according to claim 12, wherein said low-temperature heat source is of from 20° to 70° C.

14. The adsorption heat pump according to claim 1, wherein said porous substance has at least one peak inclusive of a peak of a maximum intensity at a d-spacing of 2 nm or more in an X-ray diffraction pattern.

15. The adsorption heat pump according to claim 1, wherein said porous substance is formed in granular form.

16. The adsorption heat pump according to claim 1, wherein said porous substance has a composition equivalent to that of silicon oxide.

17. The adsorption heat pump according to claim 1, wherein said porous substance comprises silicon dioxide, and at least one additive selected from the group consisting of aluminum (Al), titanium (Ti), magnesium (Mg), zirconium (Zr), gallium (Ga), beryllium (Be), yttrium (Y), lanthanum (La), tin (Sn), lead (Pb), vanadium (V), and boron (B).

* * * * *

UNITED STATES PATENT AND TRADEMARK OFFICE
CERTIFICATE OF CORRECTION

PATENT NO. : 5,768,910
DATED : June 23, 1998
INVENTOR(S) : Shinji INAGAKI et al

It is certified that error appears in the above-identified patent and that said Letters Patent is hereby corrected as shown below:

On the title page:

Item: [73], "Kabushiki Kaisha Toyota Chuo Kenkyuso" should read --Kabushiki Kaisha Toyota Chuo Kenkyusho--.

Column 19, line 2, "dimethylallylammonium" should read --dimethylalkylammonium--.

Signed and Sealed this

Twenty-third Day of February, 1999

Attest:

Q. TODD DICKINSON

*Attesting Officer*          *Acting Commissioner of Patents and Trademarks*